(12) United States Patent
Inada et al.

(10) Patent No.: US 10,963,646 B2
(45) Date of Patent: Mar. 30, 2021

(54) SCENARIO PASSAGE PAIR RECOGNIZER, SCENARIO CLASSIFIER, AND COMPUTER PROGRAM THEREFOR

(71) Applicant: National Institute of Information and Communications Technology, Tokyo (JP)

(72) Inventors: Kazuaki Inada, Sendai (JP); Chikara Hashimoto, Tokyo (JP); Kentaro Torisawa, Tokyo (JP)

(73) Assignee: National Institute of Information and Communications Technology, Toyko (JP)

( * ) Notice: Subject to any disclaimer, the term of this patent is extended or adjusted under 35 U.S.C. 154(b) by 159 days.

(21) Appl. No.: 16/331,977

(22) PCT Filed: Sep. 25, 2017

(86) PCT No.: PCT/JP2017/034405
§ 371 (c)(1),
(2) Date: Mar. 10, 2019

(87) PCT Pub. No.: WO2018/056423
PCT Pub. Date: Mar. 29, 2018

(65) Prior Publication Data
US 2019/0251171 A1    Aug. 15, 2019

(30) Foreign Application Priority Data
Sep. 26, 2016  (JP) .............................. JP2016-186466

(51) Int. Cl.
*G06F 40/30*    (2020.01)
*G06F 16/00*    (2019.01)
(Continued)

(52) U.S. Cl.
CPC .............. *G06F 40/30* (2020.01); *G06F 16/00* (2019.01); *G06F 16/24578* (2019.01);
(Continued)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS 9,092,332 B2 *  7/2015  Taylor ................. G06F 11/3466
9,092,561 B2 *  7/2015  Miao ................... G06F 11/3612
(Continued)

FOREIGN PATENT DOCUMENTS

JP    H11-250085 A    9/1999
JP    2008-226168 A   9/2008
(Continued)

OTHER PUBLICATIONS

C.Hashimoto et al., "Toward Future Scenario Generation: Extracting Event Causality Exploiting Semantic Relation, Context, and Association Features." In Proceedings of the 52nd Annual Meeting of the Association for Computational Linguistics (ACL 2014), pp. 987-997 (discussed in Specification).
(Continued)

*Primary Examiner* — Lamont M Spooner
(74) *Attorney, Agent, or Firm* — Renner, Otto, Boisselle & Sklar, LLP

(57) ABSTRACT

A scenario passage pair recognizer includes: a text passage searching unit searching a set of text passages each including no more than a certain number of sentences of a document, and within which all noun phrases included in a scenario candidate co-occur; a feature extracting unit extracting a feature from each combination of the scenario candidate and each searched support passage; a classifier
(Continued)

outputting a score indicating reliability of the scenario candidate based on the support passage as a source of the feature; and a score accumulating unit and a maximum value selecting unit, accumulating the scores output from the classifier and selecting the maximum value as the reliability of the scenario candidate. The scenario classifier determines plausibility of the scenario candidate as a causality based on the feature including the score output from the scenario passage pair recognizer.

6 Claims, 12 Drawing Sheets

(51) Int. Cl.
*G06F 40/289* (2020.01)
*G06F 16/906* (2019.01)
*G06F 16/2457* (2019.01)
*G06N 20/00* (2019.01)

(52) U.S. Cl.
CPC .......... *G06F 16/906* (2019.01); *G06F 40/289* (2020.01); *G06N 20/00* (2019.01)

(56) References Cited

U.S. PATENT DOCUMENTS

| | | | | |
|---|---|---|---|---|
| 9,336,126 | B1* | 5/2016 | Masse | G06F 11/3688 |
| 9,367,609 | B1* | 6/2016 | Mianji | G06F 16/2428 |
| 10,095,685 | B2* | 10/2018 | Hashimoto | G06F 40/289 |
| 10,430,717 | B2* | 10/2019 | Hashimoto | G06N 5/022 |
| 10,437,867 | B2* | 10/2019 | Hashimoto | G06N 5/02 |
| 10,679,166 | B2* | 6/2020 | Santhanam | G06Q 20/10 |
| 2012/0101800 | A1* | 4/2012 | Miao | G06F 11/3608 |
| | | | | 703/22 |
| 2014/0331092 | A1* | 11/2014 | Taylor | G06F 11/0787 |
| | | | | 714/48 |
| 2016/0048655 | A1* | 2/2016 | Maitra | G16H 20/10 |
| | | | | 705/3 |
| 2016/0171399 | A1* | 6/2016 | Santhanam | G06Q 10/06316 |
| | | | | 705/7.36 |
| 2016/0321244 | A1* | 11/2016 | Hashimoto | G06F 40/20 |
| 2016/0328657 | A1* | 11/2016 | Hashimoto | G06F 40/30 |
| 2016/0357854 | A1* | 12/2016 | Hashimoto | G06F 40/30 |
| 2017/0116289 | A1* | 4/2017 | Deshmukh | G06F 16/2452 |
| 2018/0246953 | A1* | 8/2018 | Oh | G06N 5/025 |

FOREIGN PATENT DOCUMENTS

| | | |
|---|---|---|
| JP | 2008-282366 A | 11/2008 |
| JP | 2013-130929 A | 7/2013 |
| JP | 2015-121897 A | 7/2015 |

OTHER PUBLICATIONS

C. Hashimoto et al., "Excitatory or Inhibitory: A New Semantic Orientation Extracts Contradiction and Causality from the Web." In Proceedings of EMNLP-CoNLL 2012: Conference on Empirical Methods in Natural Language Processing and Natural Language Learning, pp. 619-630 (discussed in Specification).

J. Kazama, and K. Torisawa, (2008). "Inducing gazetteers for named entity recognition by large-scale clustering of dependency relations." In Proceedings of the 46th Annual Meeting of the Association for Computational Linguistics: Human Language Technologies (ACL-08: HLT), pp. 407-415.

C. Hashimoto et al., "Large-scale verb entailment acquisition from the web." In Proceedings of the 2009 Conference on Empirical Methods in Natural Language Processing (EMNLP2009), pp. 1172-1181.

International Search Report for corresponding App. No. PCT/JP2017/034405, dated Dec. 12, 2017.

* cited by examiner

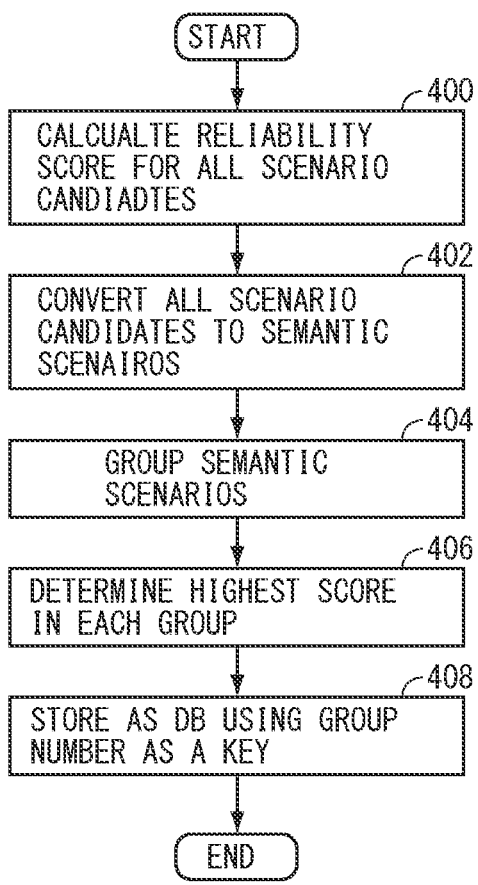

Fig. 9

| Type | DESCRIPTION |
|---|---|
| B1 | PREDICATE TEMPLATE IN SCENARIO |
| B2 | EXCITATORY OR INHIBITORY POLARITY OF PREDICATE TEMPLATES IN SCENARIO |
| B3 | LOGARITHMIC SCALE FREQUENCIES OF EACH SCENARIO NOUN PHRASE OBTAINED FROM 600 MILLION DOCUMENTS OF WEB ARCHIVE |
| B4 | SEMANTIC CLASSES OF SCENARIO NOUN PHRASES OBTAINED FROM 600 MILLION DOCUMENTS OF WEB ARCHIVE, BASED ON THE ALGORITHM OF REFERENCE 1 |
| H1 | SVM SCORES IN ACCORDANCE WITH NPL 1 GIVEN TO EACH CAUSALITY IN A GIVEN SCENARIO, NORMALIZED TO [0, 1] USING A SIGMOID FUNCTION |
| H2 | SCENARIO SVM SCORE IN ACCORDANCE WITH NPL 1 (PRODUCTS OF H1) |
| H3 | WORD OVERLAPPING SIMILARITY (COSINE SIMILARITY) AMONG THE ORIGINAL TEXTS FROM WHICH CAUSALITIES IN SCENARIOS ARE EXTRACTED |
| H4 | ENTAILMENT SCORE OF PREDICATE TEMPLATE IN THE JOINT PART OF THE SCENARIO (TWO SCORES, FOR THE FORWARD AND REVERSE DIRECTIONS) |
| SP1 | RELIABILITY SCORE OF SCENARIO PASSAGE RECOGNITION NORMALIZED TO [0, 1] USING A SIGMOID FUNCTION (IF NO TEXT PASSAGE IS FOUND, SCENARIO RELIABILITY SCORE IS SET TO 0) |
| SP2 | INDICATES WHETHER ANY TEXT PASSAGES CORRESPONDING TO THE INPUT SCENARIO CANDIDATE WERE FOUND IN SCENARIO PASSAGE RECOGNITION |
| SP3 | SUM OF THE NORMALIZED SCENARIO SCORE (H2) AND THE NORMALIZED RELIABILITY SCORE OF THE SCENARIO PASSAGE RECOGNITION (SP1) |
| GSP1 GSP2 GSP3 | FEATURES OBTAINED BY GROUPING RELIABILITY SCORES OF SCENARIO PASSAGE RECOGNITION USING GENERALIZED SCENARIOS, AND GENERATING SP1 TO SP3 USING MAXIMUM VALUES OF EACH GROUP |

Fig. 10

| Type | DESCRIPTION |
|---|---|
| WS | FOR EACH PAIR OF SCENARIO NOUN PHRASES, N-GRAMS (N = 1, 2, 3) OF SURFACE SEQUENCES, STEMS AND PART OF SPEECH OF WORDS APPEARING BETWEEN TWO SCENARIO NOUN PHRASES ON THE WORD SEQUENCE. |
| D1 | FOR EACH PAIR OF SCENARIO NOUN PHRASES, N-GRAMS (N = 1, 2, 3) OF SURFACE SEQUENCES, STEMS AND PART OF SPEECH OF WORDS APPEARING BETWEEN TWO SCENARIO NOUN PHRASES ON A SYNTACTIC DEPENDENCY TREE. IF TWO SCENARIO NOUN PHRASES EXIST IN DISTINCT SENTENCES, N-GRAM IS OBTAINED ASSUMING THAT THESE PORTIONS CORRESPONDING TO ROOTS OF RESPECTIVE SENTENCES ARE ON A SPECIAL SYMBOL COMMON TO RESPECTIVE SENTENCES REFERRED TO AS A VIRTUAL ROOT. |
| D2 | FOR EACH PAIR OF SCENARIO NOUN PHRASES, N-GRAMS (N = 1, 2, 3) OF SURFACE SEQUENCES, STEMS AND PART OF SPEECH OF WORDS APPEARING ON THE COMMON PART OF TWO SCENARIO NOUN PHRASES ON THE SYNTACTIC DEPENDENCY TREE TO THE VIRTUAL ROOT. |
| NC | SEMANTIC CLASS OF EACH SCENARIO NOUN PHRASE CALCULATED FROM 600 MILLION DOCUMENTS OF WEB ARCHIVE, BASED ON THE ALGORITHM OF REFERENCE 1 |
| EP1 | FOR EACH SCENARIO NOUN PHRASE, WHETHER OR NOT THE PREDICATE TEMPLATE IN SCENARIO AND PREDICATE TEMPLATE ON TEXT PASSAGE HAVE THE SAME POLARITY/DIFFERENT POLARITIES |
| EP2 | NUMBER OF SAME POLARITIES AND THE NUMBER OF DIFFERENT POLARITIES BETWEEN PREDICATE TEMPLATES ON THE SCENARIO AND ON THE SUPPORT PASSAGE |

SCENARIO PASSAGE PAIR RECOGNIZER, SCENARIO CLASSIFIER, AND COMPUTER PROGRAM THEREFOR

TECHNICAL FIELD

The present invention relates to natural language processing in the field of artificial intelligence and, more specifically, to a technique of determining whether a causality candidate (referred to as a "scenario candidate") obtained by chaining expressions representing causality provides coherence as chained causalities.

BACKGROUND ART

Causality refers to an ordered paired data of an expression describing a cause (event expression) and an event expression describing its effect, such as "global warming progresses→glaciers retreat" and "glaciers retreat→sea levels rise." An expression consisting of three or more event expressions such as "global warming progresses→glaciers retreat→sea levels rise" obtained by chaining two or more such causalities is referred to as a scenario. Automatic generation of such scenarios may be regarded as an attempt to automate a decision making scheme based on simulation called scenario planning for "assessing potential chances in the future and making a strategy or plan." By examining automatically generated scenarios, better decision making considering potential chances and risks in the future becomes possible. As a result, it may become possible to get a chance or to avoid a risk presented by the scenario.

Automatic scenario generation is actively studied recently. Non-Patent Literature 1 reports that a scenario "global warming worsens→sea temperature rises→*vibrio parahaemolyticus* pollutes→food poisoning increases," which was described in an article published in 2013, was generated using only the documents preceding the contribution of the article.

The technique described in Non-Patent Literature 1 generates a scenario by chaining causalities obtained from a large scale web archive. The causality obtained by the authors consisted of two events such as "global warming worsens→sea temperature rises," and "sea temperature rises→*vibrio parahaemolyticus* pollutes." By chaining the two causalities "global warming worsens→sea temperature rises" and "sea temperature rises→*vibrio parahaemolyticus* pollutes," the scenario "global warming worsens→sea temperature rises→*vibrio parahaemolyticus* pollutes" was generated.

According to Non-Patent Literature 1, if the effect portion of one and the cause portion of the other of two causalities are determined to be substantially the same, it is determined that these two causalities can be chained.

CITATION LIST

Non Patent Literature

NPL 1: Hashimoto, C., Torisawa, K., Kloetzer, J., Sano, M., Varga, I., Oh, J.-H., and Kidawara, Y. (2014). "Toward Future Scenario Generation: Extracting Event Causality Exploiting Semantic Relation, Context, and Association Features." In Proceedings of the 52nd Annual Meeting of the Association for Computational Linguistics (ACL 2014), pp. 987-997.

NPL2: Hashimoto, C., Torisawa, K., Saeger, S. D., Oh, J.-H., and Kazama, J. (2012). "Excitatory or inhibitory: A new semantic orientation extracts contradiction and causality from the web." In Proceedings of EMNLP-CoNLL 2012: Conference on Empirical Methods in Natural Language Processing and Natural Language Learning, pp. 619-630.

SUMMARY OF INVENTION

Technical Problem

By the method described in Non-Patent Literature 1, however, an inconsistent erroneous scenarios such as "swallows barium→go through an X-ray examination→board on a plane" may possibly be generated. One of the reasons why such a scenario is generated is insufficient comprehension of consistency of the contents of causalities to be chained. The scenario "swallows barium→go through an X-ray examination→board on a plane" results from chaining the causality "swallows barium→go through an X-ray examination" of hospital contexts and the causality "go through an X-ray examination→board on a plane" of airport contexts without giving full attention to the respective contexts. To avoid this problem, the method according to Non-Patent Literature 1 made a filter to assess consistency between causalities to be chained, using degree of overlap between words in the original texts from which the event causalities were extracted. The applied filter was effective to some extent but not sufficient.

Therefore, an object of the present invention is to provide a scenario classifier for determining whether or not a scenario candidate obtained by chaining causalities is a coherent one having consistent context, and to provide a scenario passage pair recognizer for calculating degree of reliability of scenario candidates for this purpose.

Solution to Problem

According to a first aspect, the present invention provides a scenario passage pair recognizer receiving a scenario candidate including at least three event expressions possibly expressing a chained causality, and outputting a score indicating reliability of the scenario candidate by finding passages supporting subject matter of the scenario candidate in a plurality of documents. The scenario passage pair recognizer is used connected to a computer-readable storage device containing the plurality of documents. The scenario passage pair recognizer includes: a text passage searching means for searching, in the plurality of documents, a set of such text passages that each includes no more than a certain number of sentences of a document and in each of which all noun phrases included in the scenario candidate co-occur; a feature extracting means for extracting a predetermined feature from each of combinations of the scenario candidate and each of the text passages searched by the text passage searching means; a score output means learned in advance by machine learning to output, upon receiving the feature for each of the combinations related to the scenario candidate, a score indicating reliability of an input scenario candidate calculated based on the text passages as a source of the feature; and a score selecting means for selecting and outputting, for each of the combinations related to the scenario candidate, the maximum value of the scores output from the score output means as the reliability of the scenario candidate.

Preferably, the certain number is an integer not smaller than 2 and not larger than 10 and preferably, not smaller than 3 and not larger than 8.

More preferably, the scenario passage pair recognizer further includes a storage means for storing a scenario candidate having the score higher than a threshold value, among the scenario candidates.

According to a second aspect, the present invention provides a scenario classifier that receives a scenario candidate including at least three event expressions possibly expressing a chained causality and determines whether or not the scenario candidate is plausible as a causality. The scenario classifier includes: a score receiving means, receiving an input of the scenario candidate, applying the scenario candidate to any of the above-described scenario passage pair recognizers, and receiving the reliability score output from the scenario passage pair recognizer; a feature extracting means for extracting a prescribed feature from the scenario candidate; and a determining means learned in advance by machine learning to output, upon receiving an input including the prescribed feature extracted by the feature extracting means and the score received by the score receiving means, a score indicating plausibility of the scenario candidate as a causality.

According to a third aspect, the present invention provides a computer program causing a computer to function as various means of the apparatuses described above.

BRIEF DESCRIPTION OF DRAWINGS

FIG. 8 is a flowchart representing a control structure of a program for calculating group-by-group semantic scenario scores.

FIG. 9 shows, in the form of a table, a list of features used by the classifier.

FIG. 10 shows, in the form of a table, a list of features used by the scenario passage pair recognizer.

DESCRIPTION OF EMBODIMENTS

Figure 1:
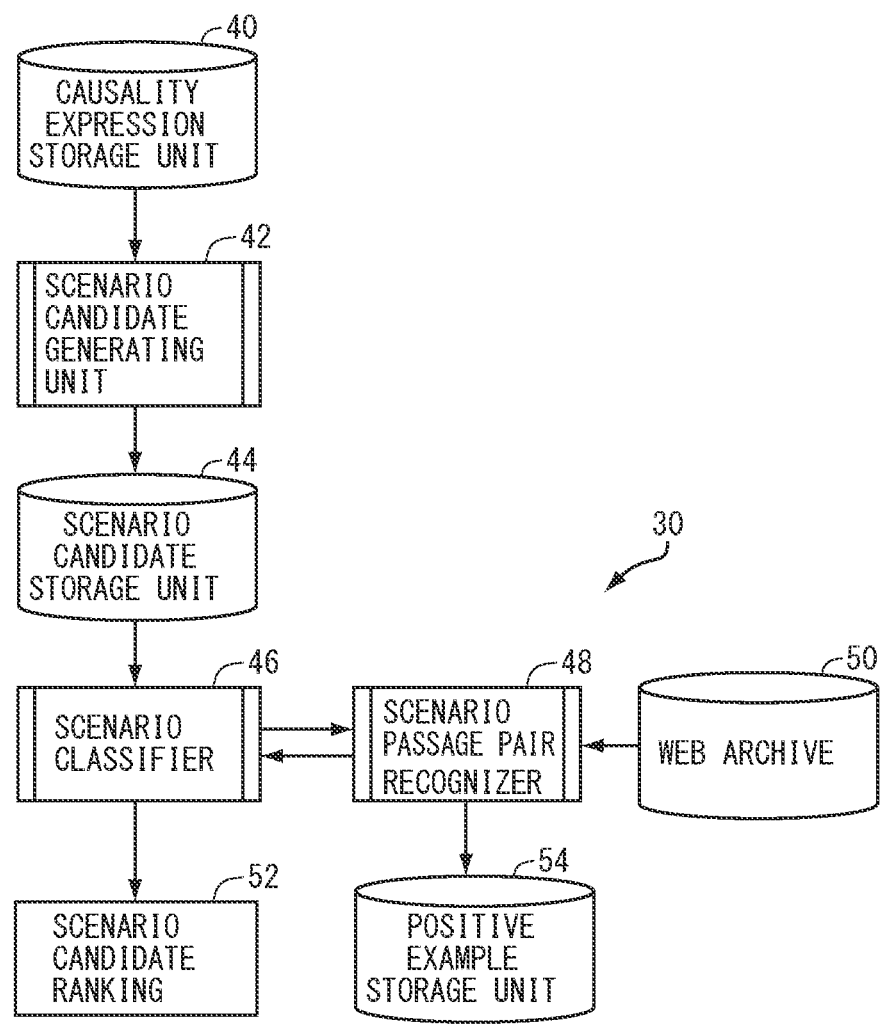
FIG. 1 is a block diagram showing a configuration of a scenario generation system in accordance with an embodiment of the present invention.

In the following description and in the drawings, the same components are denoted by the same reference characters. Therefore, detailed description thereof will not be repeated. In the following description, "SVM" stands for a "support vector machine" that is a well-known classifier in the field of machine learning. Further, in the present specification, "SPPR" represents "Scenario Passage Pair Recognizer."

First Embodiment

[Configuration]
<Overall Configuration>

FIG. 1 is a block diagram showing a scenario generation system 30 in accordance with an embodiment of the present invention. Referring to FIG. 1, scenario generation system 30 includes: a causality expression storage unit 40, which is a computer-readable storage device, for storing a large number of causality expressions consisting of pairs of event expressions representing causalities; a scenario candidate generating unit 42 connected to causality expression storage unit 40, taking out a pair of causalities having, one as an effect portion and the other as a cause portion, a substantially matching portion, from the causalities stored in causality expression storage unit 40, and by chaining this pair at the matching portion, generating a scenario candidate; a scenario candidate storage unit 44 storing a large number of scenario candidates generated by scenario candidate generating unit 42; and a scenario classifier 46 calculating, for each of the scenario candidates stored in scenario candidate storage unit 44, a score indicating whether it is coherent to represent causality, in consideration of contexts in which the candidates appear, and outputting a scenario candidate ranking 52 listing the scenario candidates in a descending order of the scores. The generation of scenario candidates by scenario candidate generating unit 42 is done in the manner described in Non-Patent Literature 1.

Scenario generation system 30 further includes: a web archive 50 storing a huge amount of documents collected from webs on the Internet; a scenario passage pair recognizer 48, receiving a scenario candidate from scenario classifier 46, extracting a text passage possibly representing the scenario candidate from web archive 50, performing a process of determining whether or not the extracted text passage as a whole represents (supports) the content represented by the scenario candidate, and based on the result of determination, calculating and outputting to scenario classifier 46 a score indicating the degree of reliability as a causality of the scenario candidate, and separately outputting a scenario candidate having a high score as a scenario passage; and a positive example storage unit 54 storing the scenario candidate having a high score output from scenario passage pair recognizer 48, for using it as a positive example at the time of learning of scenario classifier 46.

Each of the causality expressions stored in causality expression storage unit 40 is a combination of expressions, that is, an event expression representing a cause and an event expression representing its effect. These event expressions each consist of a combination of a noun phrase and a predicate, such as "global warming progresses" and "glaciers retreat." Actually, such an event expression is expressed as a combination of a predicate having a slot (variable) indicating a subject portion and a noun phrase inserted to the slot, such as "X progresses"+"global warming" and "X retreat"+"glaciers." In the present specification, the combination of a slot and a predicate such as "X progresses" will be referred to as a "predicate template." In other words, each causality is expressed by a combination of a predicate template and a noun phrase.

A predicate template has an excitatory/inhibitory polarity (hereinafter simply referred to as "polarity") assigned. The polarity has been proposed in Non-Patent Literature 2, and it was introduced to acquire causalities and contradictory event expressions. A predicate template is classified in accordance with its polarity, either to excitatory, inhibitory or neutral. The excitatory polarity is given to a predicate template that activates the function, effect, purpose or role of the noun phrase of its argument such as "X progresses." An inhibitory polarity is given to a predicate template that deactivates or suppresses the effect of the noun phase of its argument such as "X stops." A predicate template classified neither to excitatory nor inhibitory is determined to be neutral. The polarities of predicate templates are determined beforehand by natural language processing of a huge amount of documents.

<Configuration of Scenario Candidate Generating Unit 42>

Figure 2:
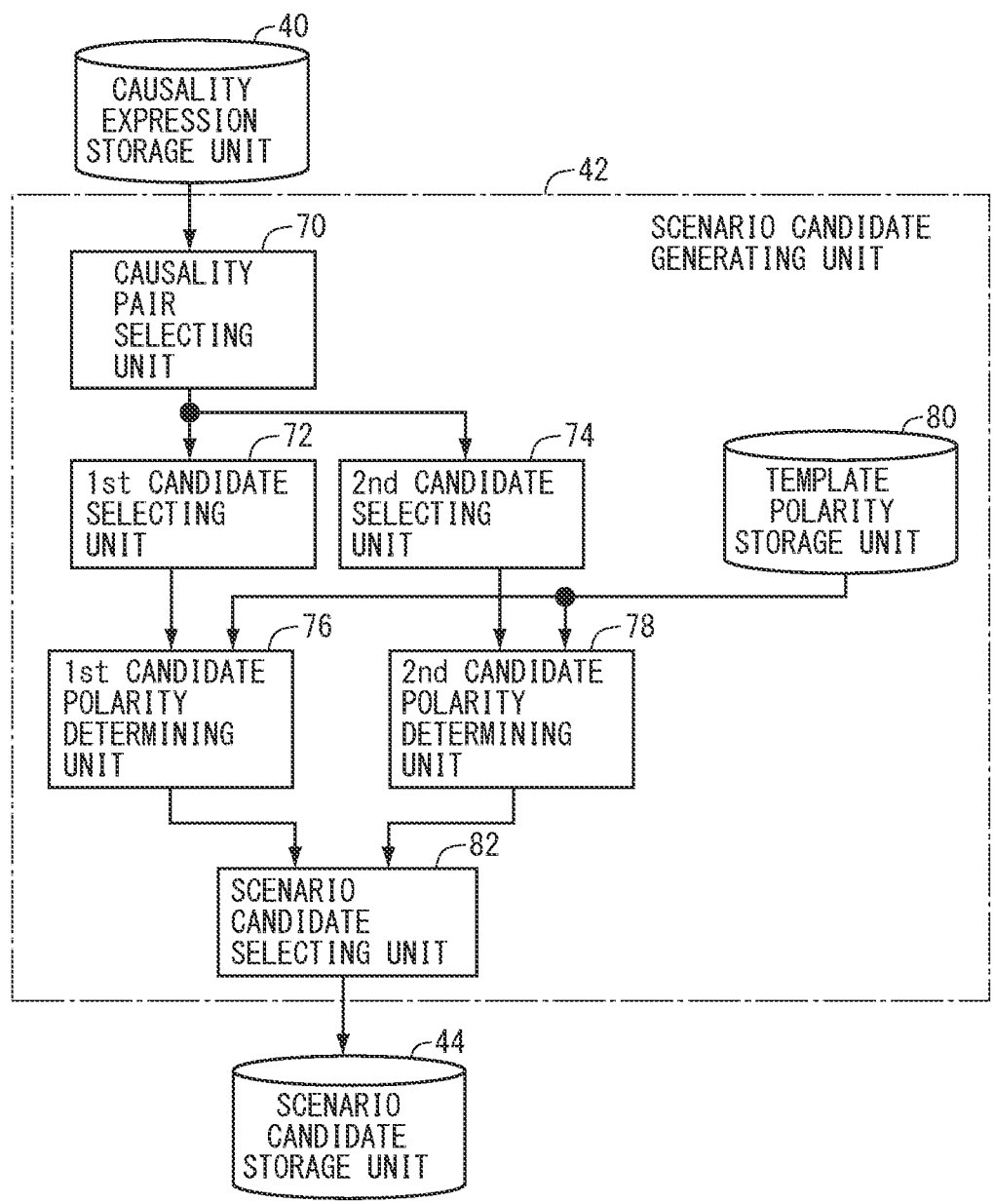
FIG. 2 is a block diagram of a scenario candidate generating unit used in the scenario generation system shown in FIG. 1.

Referring to FIG. 2, scenario candidate generating unit 42 includes: a causality pair selecting unit 70 selecting, from the causalities stored in causality expression storage unit 40, such a pair of causalities in which a noun phrase is shared by the effect portion of one and the cause portion of the other; a first candidate selecting unit 72 that selects, from the causality pair selected by the causality pair selecting unit 70, a first causality candidate having the shared noun phrase as the effect portion; and a second candidate selecting unit 74 that selects a second causality candidate having the shared noun phrase as the cause portion.

Scenario candidate generating unit 42 further includes: a template polarity storage unit 80 for storing the polarities of predicate templates; a first candidate polarity determining unit 76 that determines the polarity of predicate template of the first causality candidate selected by the first candidate selecting unit 72 by referring to template polarity storage unit 80, and outputs the result by adding it to the first causality candidate; a second candidate polarity determining unit 78 that determines the polarity of predicate template of the second causality candidate selected by the second candidate selecting unit 74 by referring to template polarity storage unit 80, and outputs the result by adding it to the second causality candidate; and a scenario candidate selecting unit 82 that selects, from the first causality candidates output from first candidate polarity determining unit 76 and the second causality candidates output from second candidate polarity determining unit 78, a combination of causality candidates having predicate templates of matching polarities as a scenario candidate, and outputs it to scenario candidate storage unit 44.

<Configuration of Scenario Classifier 46>

Figure 3:
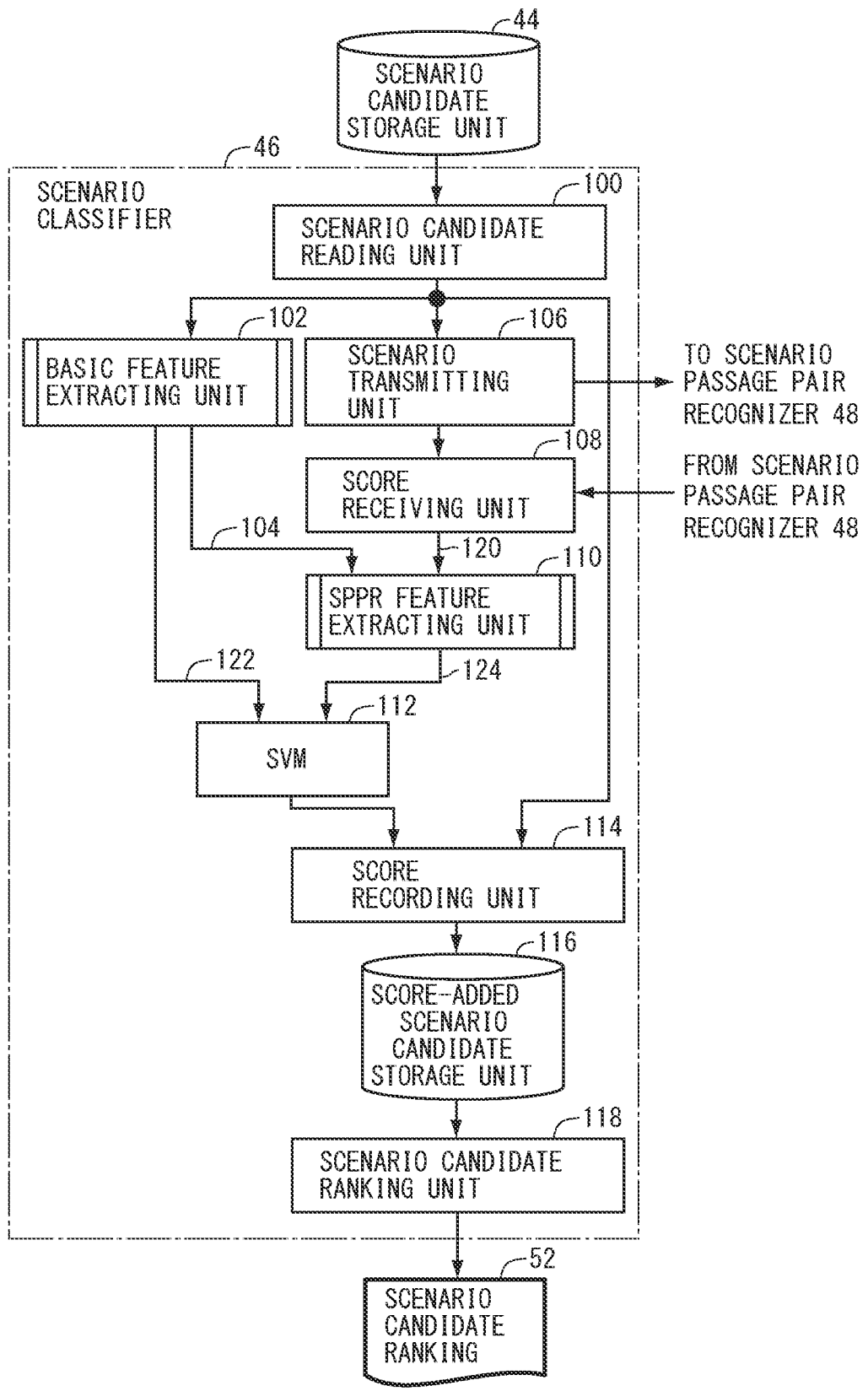
FIG. 3 is a block diagram of a scenario classifier used in the scenario generation system shown in FIG. 1.

Referring to FIG. 3, scenario classifier 46 includes: a scenario candidate reading unit 100 reading and outputting the scenario candidates in turn, one by one, stored in scenario candidate storage unit 44; a basic feature extracting unit 102 extracting a basic feature 122, which will be described later, for each scenario candidate read by scenario candidate reading unit 100 and, in addition, outputting SPPR feature generating information 104 used for extracting SPPR feature obtained by using an output from scenario passage pair recognizer 48; a scenario transmitting unit 106 transmitting a scenario candidate output from scenario candidate reading unit 100 to scenario passage pair recognizer 48 and requesting output of SPPR feature; and a score receiving unit 108 receiving a score transmitted from scenario passage pair recognizer 48 in response to the request transmitted from scenario transmitting unit 106 and outputting it as a reliability score 120, where the score indicates to what degree the scenario candidate is supported by text passages of actual documents. The reliability score 120 includes, in addition to the score, a flag indicating whether or not a support passage supporting the scenario candidate is found.

Scenario classifier 46 further includes: a SPPR feature extracting unit 110 receiving SPPR feature generating information 104 from basic feature extracting unit 102 and reliability score 120 from score receiving unit 108, for outputting SPPR feature 124 reflecting the result of determination by scenario passage pair recognizer 48; and an SVM 112 pre-trained by machine learning such that upon receiving a feature vector comprised of basic feature 122 from basic feature extracting unit 102 and SPPR feature 124 from SPPR feature extracting unit 110, a score indicating to what degree the scenario candidate output from scenario candidate reading unit 100 is coherent as a scenario representing causality is calculated and output in accordance with the feature value.

Scenario classifier 46 further includes: a score recording unit 114 connected to receive the score and the scenario candidate output from SVM 112 and scenario candidate reading unit 100, respectively, for outputting the scenario candidate and the score output from SVM 112 to be stored in association with each other; a score-added scenario candidate storage unit 116 accumulating and storing the scenario candidates and their scores output from score recording unit 114 in a manner allowing reading of these in association with each other; and a scenario candidate ranking unit 118 ranking the scenario candidates stored in score-added scenario candidate storage unit 116 by sorting them in a descending order of the scores and thereby generating and outputting a scenario candidate ranking 52.

The features used by SVM 112 of scenario classifier 46 are listed in FIG. 9.

Referring to FIG. 9, the features are divided into four groups. The first group includes B1 to B4, the second group includes H1 to H4, the third group includes SP1 to SP3 and the fourth group includes GSP1 to GSP3.

In the first group, B1 represents predicate templates in a scenario; B2 represents excitatory or inhibitory polarity for the predicate templates in a scenario; B3 represents logarithmic scale frequencies of each noun phrase in a scenario obtained from 600 million documents of web archive; and B4 represents semantic class of each scenario noun phrase in the scenario obtained from 600 million documents of web archive, based on the algorithm of Reference 1.

In the second group, H1 represents SVM scores in accordance with Non-Patent Literature 1 given to each causality in a given scenario, normalized to [0,1] using a sigmoid function; H2 represents a scenario score (products of H1) in accordance with Non-Patent Literature 1; H3 represents word overlap Cosine similarity between the original sentences from which causalities in a scenarios are extracted; and H4 represents entailment score in the joint part of the scenario (the common predicate template of the event expressions connecting the two causalities). The scores are for the forward and reverse directions.

In the third group, SP1 represents the value of reliability score of scenario passage recognition normalized to [0, 1] using a sigmoid function. If no text passage is found for the scenario, the reliability score of scenario passage recognition is set to 0. SP2 is an indicator of whether any text passage corresponding to the input scenario could be found. SP3 is the sum of the normalized scenario score (H2) and the normalized reliability score of the scenario passage recognition (SP1).

In the fourth group, GSP1, GSP2 and GSP3 correspond to SP1, SP2 and SP3 of the third group. GSP1, GSP2 and GSP3 represent values of SP1 to SP3 calculated by generalizing scenarios (semantic scenarios), dividing these into groups, and finding the maximum value of reliability scores of scenario passage recognition in each group. By way of example, a scenario "global warming progresses→glaciers retreat→sea level rises" is expressed as "#C101: excitatory→#C73: inhibitory→#C33: excitatory (where "#C" denote semantic classes)" in semantic scenario. To acquire GSP1 to GSP3, first, scores of scenario passage recognition of all scenario candidates are calculated. Thereafter, all scenarios are converted to semantic scenarios, and scenarios and scores having common semantic scenarios are collected as groups. Thereafter, the highest score in each group is regarded as the scenario passage recognition score of the scenarios belonging to the group, and features are acquired in the similar manner as used for SP1 to SP3.

<Configuration of Basic Feature Extracting Unit 102 of Scenario Classifier 46>

Figure 4:
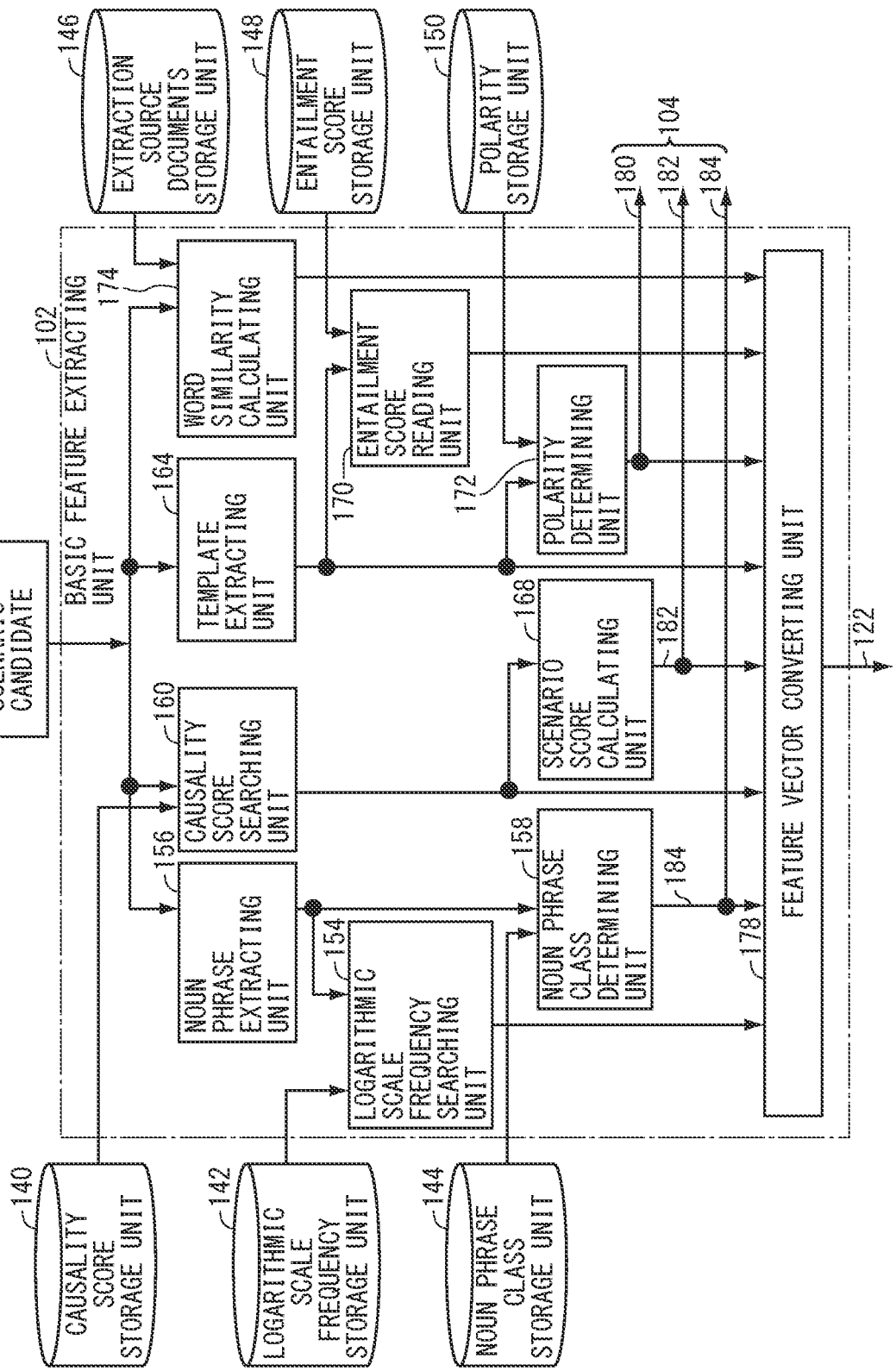
FIG. 4 is a block diagram of a basic feature extracting unit included in the scenario classifier shown in FIG. 3.

Referring to FIG. 4, basic feature extracting unit 102 generates basic features 122 using various pieces of information. The pieces of information used by basic feature extracting unit 102 for generating basic features 122 include causality scores, logarithmic scale frequencies, noun phrase classes, extraction source documents, entailment scores and predicate template polarities. These will be described in the following.

—Causality Score—

A causality score refers to a score output from SVM used in unsupervised scenario generation in accordance with Non-Patent Literature 1 for each of the causalities included in a given scenario, normalized to the range of [0, 1] using a sigmoid function. This score indicates the plausibility as a causality of each causality itself. This value is calculated beforehand and stored causality by causality as DB in causality score storage unit 140, and using a causality as a key, its causality score can be retrieved. In the present embodiment, the method in accordance with Non-Patent Literature 1 was used for calculating the causality scores.

—Log-Scale Frequency—

This is a logarithmic representation of frequency of appearance of each noun phrase included in a large number of documents, calculated in advance. This information is stored as DB in logarithmic scale frequency storage unit 142, and by using a noun phrase as a key, its logarithmic scale frequency can be retrieved.

—Noun Phrase Class—

This represents a semantic class of a noun phrase. In the present embodiment, based on the method disclosed in Reference 1 described at the end of the Specification, noun phrase classes are calculated in advance from a large number of documents included in the web archive, and stored as DB in noun phrase class storage unit 144. The noun phrase class can be retrieved from noun phrase class storage unit 144 by using a noun phrase as a key.

—Extraction Source Document—

As will be described later, some of the features include a degree of similarity (cosine similarity) of word overlapping between documents from which causalities included in a given scenario are extracted. In the present embodiment, in order to calculate this feature, all documents as the source of scenario extraction are stored in extraction source documents storage unit 146, and the similarity is calculated each time an actual scenario candidate is selected.

—Entailment Score—

The entailment score represents, between two predicate templates, the degree as to how much one predicate template entails the other. By switching the order of predicate templates, two entailment scores are calculated between two predicate templates. The entailment scores are calculated in advance in accordance with Reference 2, and stored in entailment score storage unit 148 as database using an ordered pair of two predicate templates as a key.

—Predicate Template Polarity—

Each predicate template has a polarity assigned by the technique of Non-Patent Literature 2, as described above. The value is stored predicate template by predicate template in polarity storage unit 150, and using a predicate template as a key, its polarity can be known.

Referring to FIG. 4, basic feature extracting unit 102 includes: a noun phrase extracting unit 156, given a scenario candidate 152, extracting a noun phrase portion (scenario noun phrase) of "noun phrase+predicate" forming an event expression included in the scenario candidate; a logarithmic scale frequency searching unit 154 searching, for each scenario noun phrase extracted by noun phrase extracting unit 156, its logarithmic scale frequency from logarithmic scale frequency storage unit 142 and outputting the same as a part of features; a noun phrase class determining unit 158 searching and determining, for each of the scenario noun phrases extracted by noun phrase extracting unit 156, its noun phrase class from noun phrase class storage unit 144 and outputting it as a part of features; a causality score searching unit 160 searching a causality score of each causality included in scenario candidate 152 from causality score storage unit 140 and outputting it as a part of features; and a scenario score calculating unit 168 calculating a scenario score by multiplying the scores of causalities included in scenario candidate 152 searched by causality score searching unit 160, and outputting it as a part of features.

Basic feature extracting unit 102 further includes: a template extracting unit 164 extracting a predicate template forming an event expression of each causality from scenario candidate 152; a polarity determining unit 172 determining the polarity of each predicate template by searching the polarity of each predicate template extracted by template extracting unit 164 from polarity storage unit 150 and outputting it as a part of features; an entailment score reading unit 170 reading, for a combination of two predicate templates extracted by template extracting unit 164, entailment scores in two opposite directions from entailment score storage unit 148; and a word similarity calculating unit 174 calculating the similarity of the distribution of the words contained in the documents among the original documents from which causalities included in scenario candidate 152 are extracted, and outputting the result as a part of features.

Basic feature extracting unit 102 further includes a feature vector converting unit 178, receiving the logarithmic scale frequency searched for each scenario noun phrase by logarithmic scale frequency searching unit 154, the noun phrase class determined for each scenario noun phrase by noun phrase class determining unit 158, the causality score searched for each causality included in scenario candidate 152 by causality score searching unit 160, the scenario score calculated by scenario score calculating unit 168, the predicate template extracted from the scenario candidate by template extracting unit 164, the polarity of each predicate template determined by polarity determining unit 172, the entailment scores in two directions for each combination of predicate templates output from entailment score reading unit 170, and the similarity of word distribution among the original documents from which causalities included in scenario candidate 152 are extracted, output from word similarity calculating unit 174, for converting these to a basic feature 122 and outputting it to SVM 112. Each noun phrase class 184 determined by noun phrase class determining unit 158, the scenario score 182 calculated by scenario score calculating unit 168 and the polarity 180 of each predicate template determined by polarity determining unit 172 are applied as SPPR feature generating information 104, to SPPR feature extracting unit 110 shown in FIG. 3.

≪Configuration of SPPR Feature Extracting Unit 110 of Scenario Classifier 46≫

Figure 5:
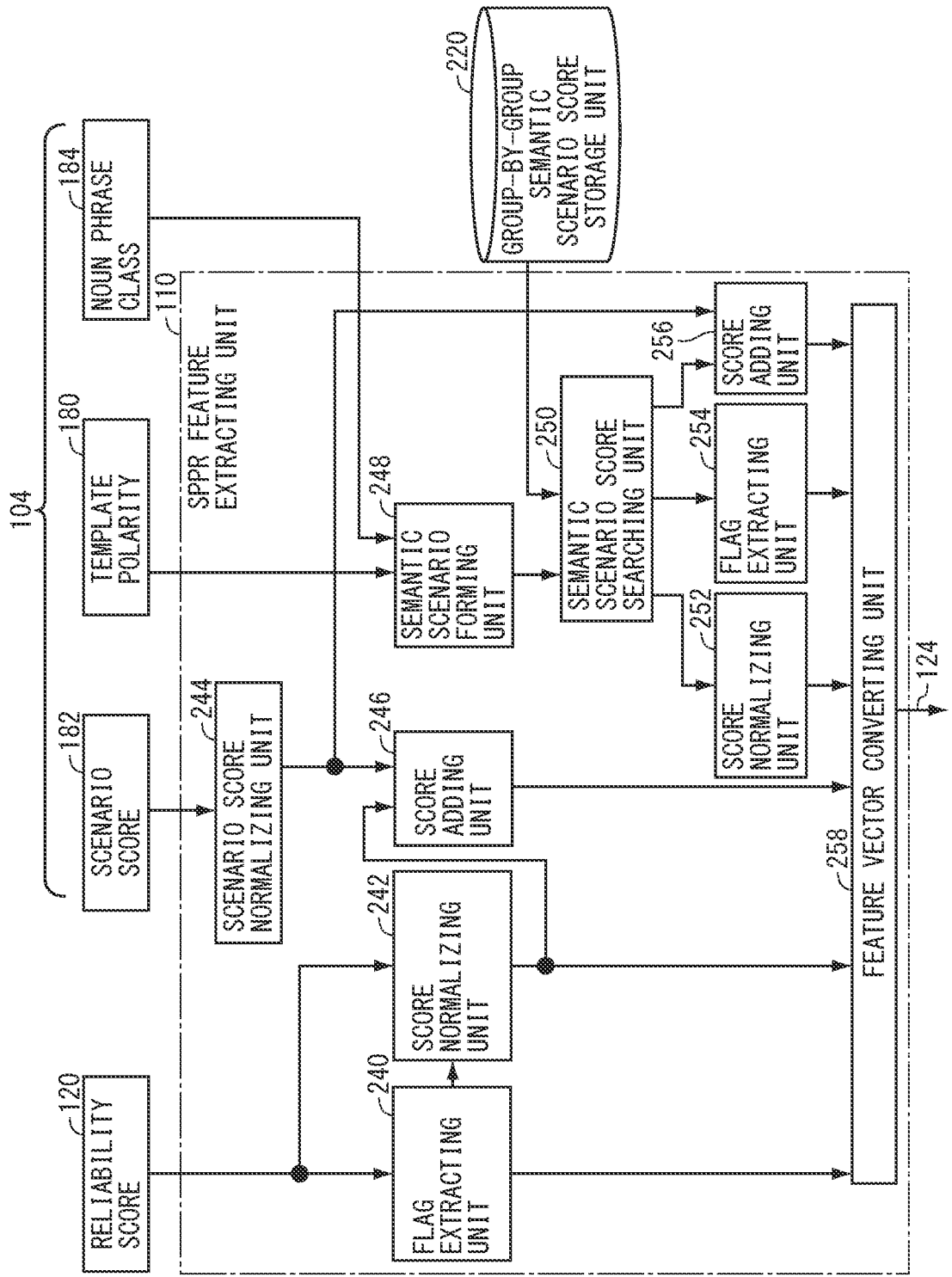
FIG. 5 is a block diagram of a scenario passage pair recognizer feature extracting unit included in the scenario classifier shown in FIG. 3.

Referring to FIG. 5, SPPR feature extracting unit 110 calculates SPPR feature 124 using the reliability score 120 from score receiving unit 108 shown in FIG. 3, SPPR feature generating information 104 from basic feature extracting unit 102 (polarity 180, scenario score 182, noun phrase class 184), and group-by-group semantic scenario score calculated in advance.

The group-by-group semantic scenario has all scenario noun phrases included in a scenario candidate replaced by corresponding noun phrase classes, and has the predicate templates replaced by their polarities. The group-by-group semantic scenario score is calculated in the following manner. First, all possible scenario candidates are collected from a large number of documents in advance, and these are all replaced by semantic scenarios. For every semantic scenario obtained in this manner, a SPPR score, which will be described later, is calculated, and the scores of common semantic scenarios are collected as groups. The highest score of each group is regarded as the semantic scenario score of the group. The scores are calculated in advance and stored as DB in group-by-group semantic scenario score storage unit 220. By replacing a scenario with a semantic scenario and by taking out the score of the corresponding group from group-by-group semantic scenario score storage unit 220, the semantic scenario score of the scenario can be obtained.

SPPR feature extracting unit 110 includes: a flag extracting unit 240 extracting, in accordance with a value of reliability score 120, a flag indicating whether or not a support passage supporting the scenario candidate has been found, and outputting it as a part of features; a score normalizing unit 242 normalizing, if the flag extracted by the flag extracting unit 240 indicates presence of a support passage supporting the scenario candidate, the reliability score 120 to [0, 1] by using a sigmoid function and outputting the result as a part of features, and if there is no supporting support passage, outputting 0 as the reliability score; a scenario score normalizing unit 244 normalizing the scenario score 182 from basic feature extracting unit 102 to [0, 1]; and a score adding unit 246 calculating the sum of the scenario score normalized by scenario score normalizing unit 244 and the reliability score normalized by score normalizing unit 242, and outputting it as a part of features.

If there is no support passage found to support a scenario candidate, various features calculated there are unreliable. Even if no support passage supporting a scenario candidate is found, however, it is highly likely that the scenario candidate is plausible if a scenario semantically similar to the scenario candidate has a high reliability score. Therefore, semantic scenarios are formed from input scenario candidates, and the features same as those described above are calculated for such semantic scenarios and used for ranking.

Specifically, SPPR feature extracting unit 110 further includes: a semantic scenario forming unit 248 forming a semantic scenario from a scenario candidate based on the polarity 180 of predicate template and on the noun phrase class 184; and a semantic scenario score searching unit 250 reading, for the semantic scenarios formed by semantic scenario forming unit 248, semantic scenario scores of a corresponding group by searching group-by-group semantic scenario score storage unit 220. Here, semantic scenario score searching unit 250 outputs a flag indicating whether or not a corresponding group exists. SPPR feature extracting unit 110 further includes: a score normalizing unit 252 for normalizing the semantic scenario score to [0, 1]; a flag extracting unit 254 extracting, from the outputs of semantic scenario score searching unit 250 a flag indicating whether or not a semantic scenario group corresponding to the formed semantic scenario exists in the group-by-group semantic scenario score storage unit 220; a score adding unit 256 adding the semantic scenario score output from semantic scenario score searching unit 250 and the normalized scenario score calculated by scenario score normalizing unit 244 and outputting the result as a part of features; and a feature vector converting unit 258 converting outputs of flag extracting unit 240, score normalizing unit 242, score adding unit 246, score normalizing unit 252, flag extracting unit 254 and score adding unit 256 collectively to a part of a feature vector and outputting as SPPR feature 124.

<Configuration of Scenario Passage Pair Recognizer 48>

Figure 6:
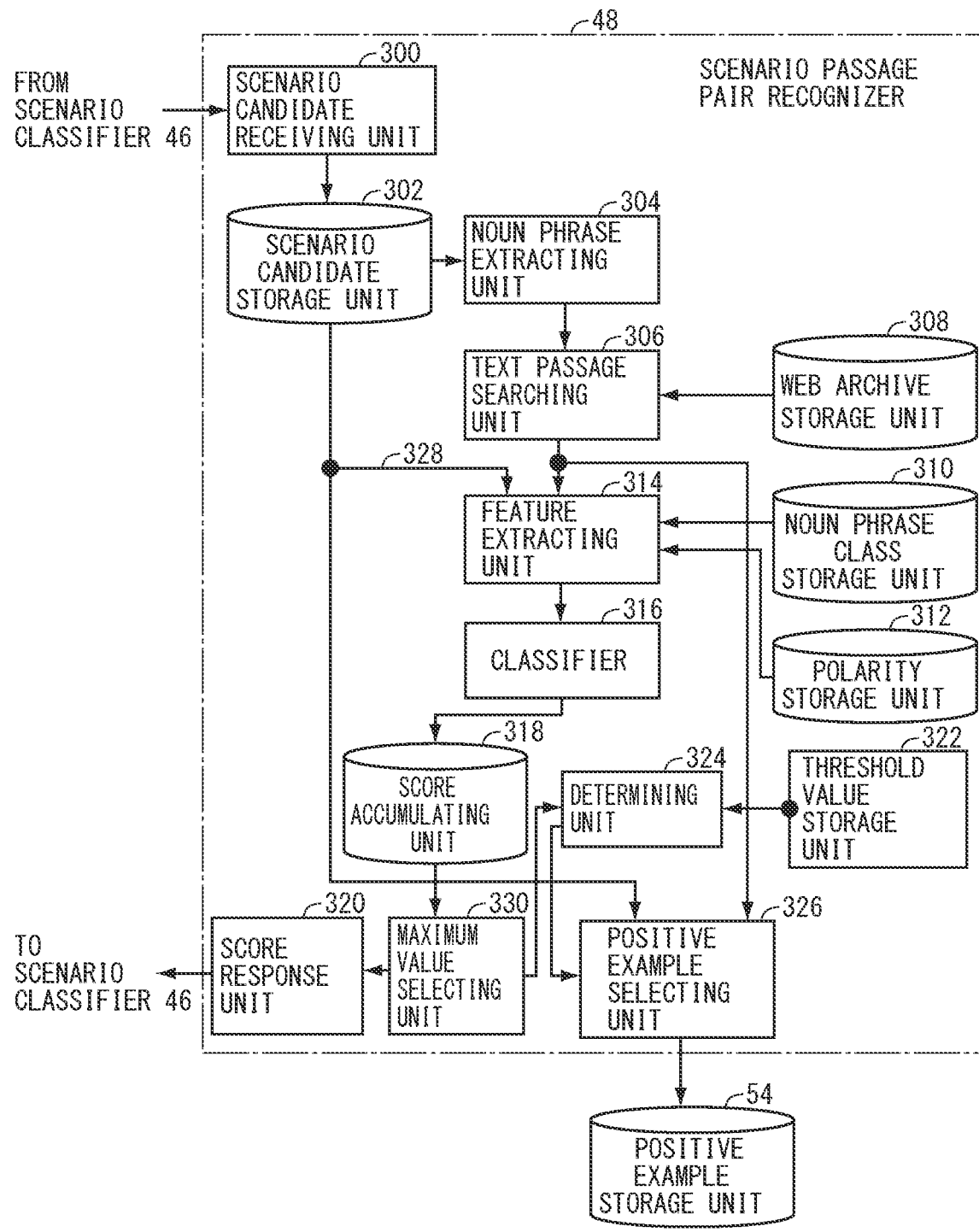
FIG. 6 is a block diagram of a scenario passage pair recognizer used in the scenario generation system shown in FIG. 1.

Referring to FIG. 6, scenario passage pair recognizer 48 includes: a web archive storage unit 308 collecting and storing in advance a large number of documents on the web; a scenario candidate receiving unit 300 receiving a scenario candidate from scenario classifier 46; a scenario candidate storage unit 302 storing scenario candidates received by scenario candidate receiving unit 300; a noun phrase extracting unit 304 extracting a scenario noun phrase from scenario candidate 328 stored in scenario candidate storage unit 302; and a text passage searching unit 306 for searching web archive storage unit 308 and for retrieving a text passage in which the scenario noun phrases extracted by noun phrase extracting unit 304 all co-occur in a prescribed scope of a document (the least number of sentences including all the noun phrases, within three sentences in the embodiment). In the present embodiment, the prescribed scope is set to at most three sentences. It may be two sentences, and four or more any number of sentences may be set as the upper limit. Preferably, this scope is at least two sentences and at most ten sentences, and preferably, at least three sentences and at most eight sentences.

Scenario passage pair recognizer 48 further includes: a noun phrase class storage unit 310 similar to the one shown in FIG. 4; a polarity storage unit 312 storing polarity of each predicate template; a feature extracting unit 314 extracting a feature for determining whether or not a text passage retrieved by text passage searching unit 306 represents (supports), as a whole, the item described in the scenario candidate, using the noun phrase class information stored in noun phrase class storage unit 310, polarity information of predicate template stored in polarity storage unit 312, and the scenario candidate 328 stored in scenario candidate storage unit 302; and a classifier 316 trained in advance by machine learning such that when the feature extracted by feature extracting unit 314 is input, a score indicating the degree (reliability) of how much the scenario candidate 328 is represented by the text passage as a whole is output. Though the classifier 316 is an SVM in the present embodiment, the classifier is not limited to an SVM. Any supervised model may be used as long as a score can be output by applying regression.

Scenario passage pair recognizer 48 further includes: a score accumulating unit 318 accumulating scores output from classifier 316; a maximum value selecting unit 330 responsive to completion of searching of text passages for the scenario candidate that is being processed and of accumulation of scores, for selecting the maximum value of the scores accumulated in score accumulating unit 318; a score response unit 320 transmitting, as a response, the score selected by maximum value selecting unit 330 as the reliability score of the scenario candidate to scenario classifier 46; a determining unit 324 comparing the score output from classifier 316 with a threshold value and determining whether the scenario candidate that is being processed is reliable or not as a scenario; a threshold value storage unit 322 for storing the threshold value to be used by determining unit 324; and a positive example selecting unit 326 selecting the scenario candidate determined to be a reliable scenario by the determining unit 324 as a positive example to be used for training scenario classifier 46, pairing it with a support passage consisting of text passage or passages and outputting the pair to a positive example storage unit 54.

For one scenario candidate, text passage searching unit 306 searches all possible text passages from web archive storage unit 308, and calculates scores for all of them by using classifier 316. Score accumulating unit 318 accumulates the scores, and when calculation of scores for all the text passages is completed, maximum value selecting unit 330 selects the maximum value of the scores and transmits it through score response unit 320 to scenario classifier 46. Since the maximum value of the scores is selected in this manner, if there is any text passage that sufficiently supports the scenario candidate, the scenario candidate comes to have a high reliability score.

≪Configuration of Feature Extracting Unit 314 of Scenario Passage Pair Recognizer 48≫

Figure 7:
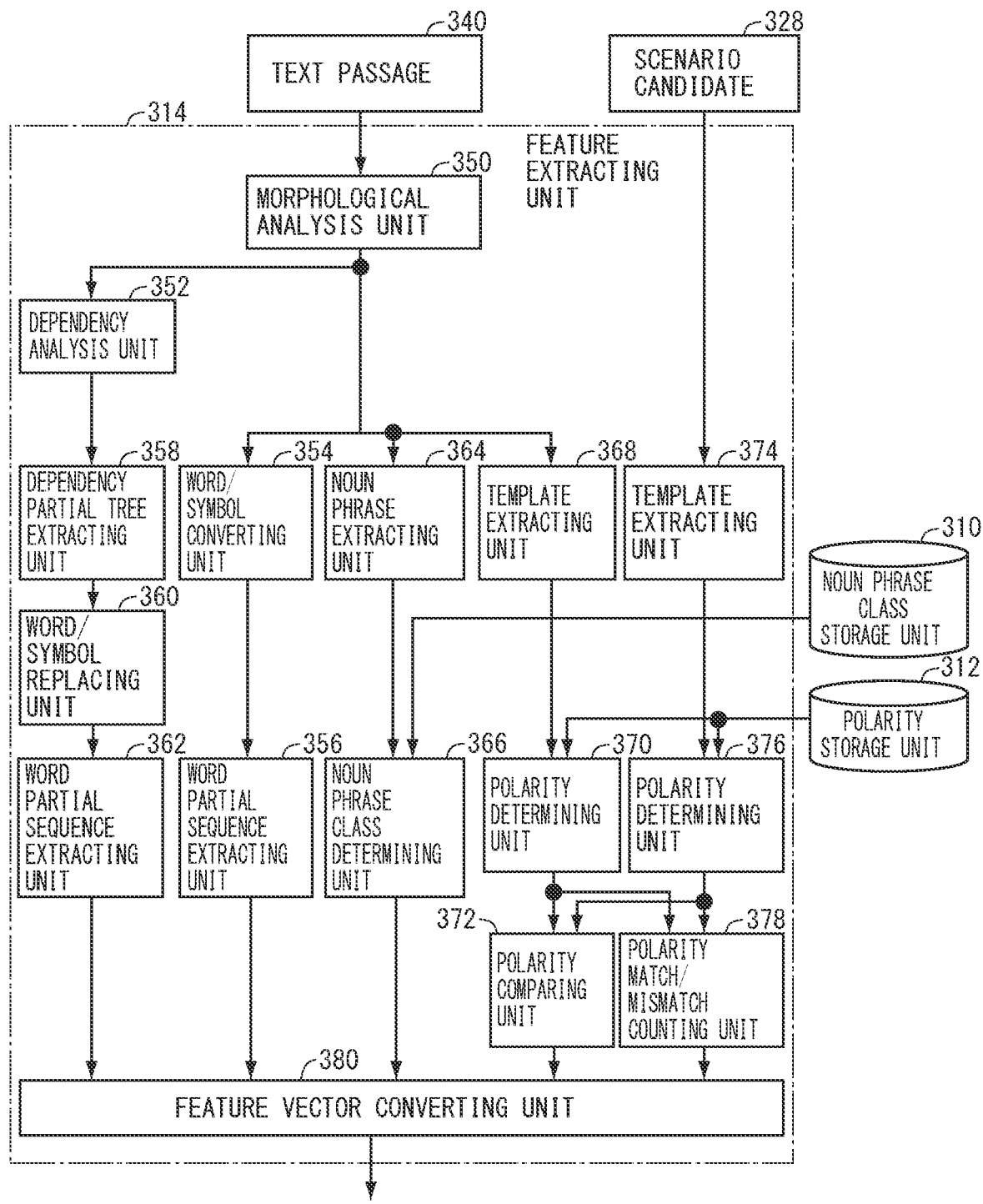
FIG. 7 is a block diagram of a feature extracting unit used in the scenario passage pair recognizer shown in FIG. 6.

Referring to FIG. 7, feature extracting unit 314 of scenario passage pair recognizer 48 includes: a morphological analysis unit 350 receiving a text passage 340 from text passage searching unit 306 and performing morphological analysis on each sentence included therein and outputting a morpheme sequence; and a dependency analysis unit 352 performing dependency analysis on the morpheme sequence output from morphological analysis unit 350, and outputting a dependency tree. From the morpheme sequence and the dependency tree obtained in this manner, features used for the classifier that determines whether or not the text passage represents the scenario candidate or not are extracted. These features can roughly be divided into partial word sequence (WS), partial trees of dependency tree (D1, D2), noun phrase class (NC) and polarities of predicate template (EP1, EP2). These features are outlined in FIG. 10.

The WS, D1 and D2 features express the context surrounding the scenario noun phrases included in the text passages in character sequences and dependency trees. These features are to capture the expressions associated with causal relations such as "ni yotte" (by means of), "no tame" (because of).

The WS features capture word sequences between two scenario noun phrases appearing on text passages, representing n-grams (n=1, 2, 3) of surface sequences, stems and part of speech appearing between two scenario noun phrases. Here, considering the situation that scenario noun phrases appear bridging a plurality of sentences, WS features are obtained by assuming that there is a delimiter (EOS) between every sentence.

The D1 features capture, for a word sequence appearing on the path of the dependency tree of two scenario noun phrases on text passages, n-grams (n=1, 2, 3) of surface sequences, stems and part of speech. As to the D1 features, for two scenario noun phrases on a partial dependency tree, similar to the WS features, considering the situation that the scenario noun phrases may appear bridging a plurality of sentences, if portions corresponding to two scenario noun phrases exist in distinct sentences, we assume that these portions are attached to a common root (virtual root) in the text passages, and word sequences on the partial dependency trees between respective scenario noun phrases are obtained.

The D2 features capture, for each pair of noun phrases in the scenario, n-grams (n=1, 2, 3) of surface sequences, stems and part of speech of words appearing on the common part of the partial trees of two scenario noun phrases, on the virtual root from respective two scenario noun phrases on the dependency tree. If the two noun phrases appear in distinct sentences, their common parent is the virtual root and, therefore, there is no n-gram that can be captured.

In order to avoid situations in which the scenario noun phrases appearing on text passages influence too strongly the determination of support passages, the scenario noun phrases on the text passages are replaced by special symbols "N0, N1, N2 (the number represents the order of event expressions on the scenario), and thereafter, the WS, D1 and D2 features were obtained.

In order to realize the above-described process, feature extracting unit 314 further includes: a word/symbol converting unit 354 receiving the morpheme sequence output from morphological analysis unit 350 and converting each word to a corresponding symbol; a word partial sequence extracting unit 356 extracting and outputting as a part of features the above-described n-gram word sequence from the morpheme sequence with the words converted to symbols by word/symbol converting unit 354; a dependency partial tree extracting unit 358 receiving a dependency tree output from dependency analysis unit 352 and extracting a dependency partial tree on the dependency tree; a word/symbol replacing unit 360 replacing each of the words on the dependency partial tree extracted by dependency partial tree extracting unit 358 with the above-mentioned symbols; and a word partial sequence extracting unit 362 extracting n-grams as word partial sequences from the dependency partial tree having the words replaced with symbols by word/symbol replacing unit 360 and outputting them as a part of features.

Feature extracting unit 314 further includes: a noun phrase extracting unit 364 extracting scenario noun phrases from morpheme sequences output from morphological analysis unit 350; a noun phrase class determining unit 366 determining the noun phrase class of each scenario noun phrase extracted by noun phrase extracting unit 364, by referring to noun phrase class storage unit 310, and outputting it as a part of features; a template extracting unit 368 extracting a morpheme sequence of each event expression from the morpheme sequences output from morphological analysis unit 350; a polarity determining unit 370 determining and outputting the polarity of each of the predicate templates output from template extracting unit 368 by referring to polarity storage unit 312; a template extracting unit 374 extracting predicate templates included in scenario candidates 328; a polarity determining unit 376 for determining and outputting the polarity of each predicate template extracted by template extracting unit 374 by referring to polarity storage unit 312; a polarity comparing unit 372, based on the outputs from polarity determining units 370 and 376, comparing, for each scenario noun phrase in scenario candidates 328, the polarity of predicate template in scenario candidate 328 with the polarity of predicate template of the same scenario noun phrase in text passage 340 and outputting a signal indicating whether the two are the same or not, as a part of features; a polarity match/mismatch counting unit 378 comparing the polarity of predicate template for each noun phrase in predicate template output by polarity determining unit 376 with the polarity of predicate template of the corresponding scenario noun phrase in text passage 340 output by polarity determining unit 370 and outputting the number of matching polarities and the number of mismatching polarities as a part of features; and a feature vector converting unit 380 converting respective features output from word partial sequence extracting unit 356, word partial sequence extracting unit 362, noun phrase class determining unit 366, polarity comparing unit 372 and polarity match/mismatch counting unit 378 to feature vectors.

<Process for Generating Group-by-Group Semantic Scenario Scores>

The method of forming group-by-group semantic scenario scores stored in group-by-group semantic scenario score storage unit 220 shown in FIG. 5 will be described with reference to FIG. 8. FIG. 8 is a flowchart representing a program realizing the process for calculating the group-by-group semantic scenario scores.

Referring to FIG. 8, the program includes: first, a step 400 of generating all possible scenario candidates from all causalities stored in causality expression storage unit 40 shown in FIG. 1, and calculating, for each scenario candidate, a reliability score using scenario passage pair recognizer 48; a step 402 of converting all the scenario candidates generated at step 400 to semantic scenarios; a step 404 of grouping semantic scenarios obtained at step 402 to like semantic scenarios; a step 406 of determining, for each group formed at step 404, the maximum value of reliability score added to the semantic scenarios included in the group, and storing it as a representative score of the group; and a step 408 of forming a database of the group scores determined at step 406 using identification information such as a group number added to each group as a key, and storing the database in group-by-group semantic scenario score storage unit 220.

<Operation>

<Pre-Learning of Scenario Passage Pair Recognizer 48>

Scenario passage pair recognizer 48 shown in FIG. 6 is pre-trained by machine learning. Specifically, first, training data consisting of scenario candidates and support passages for the scenario candidates is prepared. The scenario candidates of the training data are stored in scenario candidate storage unit 302, scenario passages that sufficiently support the scenario candidates are prepared in advance by noun phrase extracting unit 304, and features are extracted by feature extracting unit 314. These features are applied as positive examples to classifier 316. Further, passages that clearly do not support the scenario candidates are also selected in advance, their features are extracted by feature extracting unit 314, and applied as negative examples to classifier 316. In this manner, pre-learning of calculation of support passage scores by classifier 316 becomes possible.

<Formation of Group-by-Group Semantic Scenario Scores>

The group-by-group semantic scenario scores stored in group-by-group semantic scenario score storage unit 220 shown in FIG. 5 must also be prepared in advance. The group-by-group semantic scenario scores, however, cannot be accumulated unless scenario generation system 30 as a whole operates to some extent. Therefore, it is desirable that at the start of learning, tentative values are set as the group-by-group semantic scenario scores, and as the learning of scenario generation system 30 proceeds, these are newly revised by the method shown in FIG. 8.

<Pre-Learning of Scenario Classifier 46>

For learning of scenario classifier 46, while it is possible to prepare training data manually, preparation of training data involves tremendous task. Therefore, using scenario passage pair recognizer 48 shown in FIG. 6, data considered to be positive examples are accumulated in advance in positive example storage unit 54. In this process, first, a large number of documents are prepared in a web archive 50 shown in FIG. 1. A prescribed amount of causality expressions are extracted from these documents, and stored beforehand in causality expression storage unit 40.

Scenario candidates 152 are generated by scenario candidate generating unit 42 and stored in scenario candidate storage unit 44. Referring to FIG. 2, causality pair selecting unit 70 extracts, from the causalities stored in causality expression storage unit 40, pairs of causalities each having a noun phrase shared by the effect portion of one and by the cause portion of the other of the pair. Of these pairs, one causality having its effect portion common to the cause portion of the other is selected by the first candidate selecting unit 72, and one causality having its cause portion common to the effect portion of the other is selected by the second candidate selecting unit 74. The first candidate polarity determining unit 76 determines the polarity of predicate template of the causality selected by the first candidate selecting unit 72 by referring to template polarity storage unit 80. Similarly, the second candidate polarity determining unit 78 determines the polarity of the predicate template of the causality selected by the second candidate selecting unit 74 by referring to template polarity storage unit 80. If the polarities of predicate templates of the first and second candidates are the same, scenario candidate selecting unit 82 selects this pair of causalities as a scenario candidate and outputs it to scenario candidate storage unit 44. Scenario candidate storage unit 44 accumulates scenario candidates.

Referring to FIG. 3, scenario candidate reading unit 100 selects a scenario candidate from scenario candidate storage unit 44 and applies it to scenario transmitting unit 106. Scenario transmitting unit 106 applies this scenario candidate to scenario candidate receiving unit 300 of scenario passage pair recognizer 48 shown in FIG. 6. Receiving this scenario candidate, scenario generation system 30 stores it in scenario candidate storage unit 302.

Referring to FIG. 6, when a scenario candidate is stored in scenario candidate storage unit 302, noun phrase extracting unit 304 extracts noun phrases included in the scenario candidate and applies them to text passage searching unit 306. Text passage searching unit 306 searches for text passages having all these scenario noun phrases co-occurring within three sentences in web archive storage unit 308, and extracts these as support passages. Feature extracting unit 314 extracts features from sets of scenario candidates stored in scenario candidate storage unit 302 and each text passage extracted by text passage searching unit 306, and applies the features to classifier 316. Since classifier 316 has already been trained, it outputs a score indicating whether or not the text passage as a whole expresses the scenario candidate. Determining unit 324 compares the score with a threshold value stored beforehand in threshold value storage unit 322, and if the score is equal to or higher than the threshold value, it instructs positive example selecting unit 326 to have the combination of the scenario candidate and the text passage as a positive example stored as a pair of scenario candidate and support passage, in positive example storage unit 54. If the score is smaller than the threshold value, determining unit 324 simply discards the combination of the scenario candidate and the text passage without any processing.

When the above-described process is completed for every combination of a scenario candidate and every text passage extracted from web archive storage unit 308, scenario candidate generating unit 42 extracts the next scenario candidate from causality expression storage unit 40, and the same process as above is repeated. By the time the process ends for all the scenario candidates in this manner, positive example storage unit 54 shown in FIG. 6 comes to have accumulated combinations of scenario candidates and support passages that can be used as positive examples for the learning of scenario classifier 46. When these combinations are ready, it is possible to start learning of scenario classifier 46. Though it is a formidable task, the training data for training scenario classifier 46 may be prepared manually, or the training data may be prepared by any other method.

Learning of scenario classifier 46 is done in the following manner. First, scenario candidates are stored in advance in scenario candidate storage unit 44 shown in FIGS. 1 and 2. Scenario passages corresponding to the positive and negative examples for the scenario candidates are stored in advance in web archive 50 shown in FIG. 1. These are prepared manually beforehand. Regarding the positive examples, however, these can be accumulated in advance in positive example storage unit 54 by using scenario passage pair recognizer 48 as already described and, hence, these examples are used. Thereafter, by operating scenario classifier 46 and scenario passage pair recognizer 48 for these scenario candidates, SVM 112 is trained such that the maximum matching rate is attained between the result of score estimation by SVM 112 of scenario classifier 46 and the correct data prepared in advance.

After the learning of scenario classifier 46 and scenario passage pair recognizer 48 ends, scenario candidates are extracted and ranked actually by scenario classifier 46, and the operations of scenario classifier 46 and scenario passage pair recognizer 48 at this time are as follows.

<Operation of Scenario Candidate Generating Unit 42>

Referring to FIG. 2, causality pair selecting unit 70 of scenario candidate generating unit 42 selects such pairs of causalities in which the effect portion of one and the cause portion of the other share a scenario noun phrase, from the causalities stored in causality expression storage unit 40. The first candidate selecting unit 72 selects, from the pairs selected by causality pair selecting unit 70, a first causality candidate having the shared scenario noun phrase at the effect portion. The second candidate selecting unit 74 selects a second causality candidate having the shared scenario noun phrase at the cause portion. The first candidate polarity determining unit 76 determines the polarity of predicate template of the first causality candidate selected by the first candidate selecting unit 72 by referring to template polarity storage unit 80, and outputs the first causality candidate with the polarity added. Similarly, the second candidate polarity determining unit 78 determines the polarity of predicate template of the second causality candidate selected by the second candidate selecting unit 74 by referring to template polarity storage unit 80, and outputs the second causality candidate with the polarity added. Scenario candidate selecting unit 82 selects, from the first causality candidates output from the first candidate polarity determining unit 76 and the second causality candidates output from the second candidate polarity determining unit 78, a combination of causality candidates that have predicate templates of matching polarities as a scenario candidate, and outputs it to scenario candidate storage unit 44.

<Operation of Scenario Classifier 46 and Scenario Passage Pair Recognizer 48>

Referring to FIG. 3, scenario candidate reading unit 100 of scenario classifier 46 reads one by one in order the scenario candidates stored in scenario candidate storage unit 44. Basic feature extracting unit 102 extracts basic features 122 from scenario candidates output from scenario candidate reading unit 100 and outputs them to SVM 112, and outputs SPPR feature generating information 104 used for extracting SPPR features to SPPR feature extracting unit 110. The operation of basic feature extracting unit 102 is clear from the description of FIG. 4 and, therefore, description will not be repeated here.

Scenario transmitting unit 106 transmits the scenario candidates output from scenario candidate reading unit 100 to scenario passage pair recognizer 48 and requests output of SPPR features.

Referring to FIG. 6, receiving the request, scenario candidate receiving unit 300 of scenario passage pair recognizer 48 stores the scenario candidates in scenario candidate storage unit 302. Noun phrase extracting unit 304 extracts scenario noun phrases from each scenario candidate stored in scenario candidate storage unit 302 and applies them to text passage searching unit 306. Text passage searching unit 306 takes out from web archive storage unit 308 such a text passage in which all the scenario noun phrases extracted by noun phrase extracting unit 304 co-occur within three sentences, and applies a portion thereof consisting of the minimum number of sentences as a text passage, to feature extracting unit 314. Feature extracting unit 314 extracts, from each of the text passages extracted by text passage searching unit 306, features to be applied to classifier 316, based on the noun phrase class information stored in noun phrase class storage unit 310, the polarity information of predicate template stored in polarity storage unit 312, and the scenario candidates received by scenario candidate receiving unit 300. The process for extracting features is as described above with reference to FIG. 7.

Receiving the features extracted by feature extracting unit 314, classifier 316 outputs a score indicating the degree of to what extent the scenario candidate that is being processed is represented by the text passage as a whole. Score accumulating unit 318 accumulates the scores. Maximum value selecting unit 330 selects, in response to completion of searching of all the text passages for the scenario candidates received by scenario candidate receiving unit 300 and all the score calculations, the maximum value of the scores stored in score accumulating unit 318. Score response unit 320 transmits this maximum value as the reliability score of the scenario candidate to scenario classifier 46 as a response. Here, if no support passage can be extracted by text passage searching unit 306 from web archive storage unit 308, in the present embodiment, maximum value selecting unit 330 does not output a score value, and sets a flag indicating that no support passage could be found. In response, score response unit 320 transmits a response including the flag to scenario classifier 46.

In the present embodiment, determining unit 324 and positive example selecting unit 326 do not operate in this situation. However, if the score output from classifier 316 is higher than the threshold value and any support passage for the scenario candidate that has not been accumulated by that time is detected, this may be further accumulated in positive example storage unit 54 by positive example selecting unit 326.

Again referring to FIG. 3, score receiving unit 108 of scenario classifier 46 receives the score transmitted from scenario passage pair recognizer 48 and outputs it as reliability score 120 to SPPR feature extracting unit 110. Reliability score 120 includes, in addition to the score, the flag indicating whether or not any support passage supporting the scenario candidate has been found.

Referring to FIG. 5, receiving the reliability score 120, flag extracting unit 240 of SPPR feature extracting unit 110 extracts the flag value included in reliability score 120 and outputs it to flag extracting unit 240 and to score normalizing unit 242. If the flag extracted by flag extracting unit 240 indicates presence of a support passage, score normalizing unit 242 normalizes the score in reliability score 120 to [0, 1] by a sigmoid function and outputs it as a part of features. If there is no support passage, score normalizing unit 242 outputs 0 as the reliability score. The normalized score output from score normalizing unit 242 is applied to score adding unit 246 and feature vector converting unit 258.

Scenario score normalizing unit 244 normalizes scenario score 182 from basic feature extracting unit 102 to [0, 1] and applies it to score adding units 246 and 256. Score adding unit 246 calculates the sum of the scenario score normalized by scenario score normalizing unit 244 and the reliability score normalized by score normalizing unit 242, and outputs it as a part of features to feature vector converting unit 258.

Semantic scenario forming unit 248 of SPPR feature extracting unit 110 forms a semantic scenario from a scenario candidate, based on the polarity 180 of predicate template and noun phrase class 184, and applies it to semantic scenario score searching unit 250. For the semantic scenario, semantic scenario score searching unit 250 reads semantic scenario scores of the corresponding group by searching the group-by-group semantic scenario score storage unit 220, and applies it to score normalizing unit 252, flag extracting unit 254 and score adding unit 256. At this time, semantic scenario score searching unit 250 also output a flag indicating whether or not there is a corresponding group.

Score normalizing unit 252 of SPPR feature extracting unit 110 normalizes the semantic scenario score to [0, 1] and outputs it as a part of features to feature vector converting unit 258. Flag extracting unit 254 extracts, from the outputs of semantic scenario score searching unit 250, a flag indicating whether or not a semantic scenario group corresponding to the formed semantic scenario exists in group-by-group semantic scenario score storage unit 220 and applies it as a part of features to feature vector converting unit 258. Score adding unit 256 adds the semantic scenario score output from semantic scenario score searching unit 250 and the normalized scenario score calculated by scenario score normalizing unit 244, and applies the result as a part of features to feature vector converting unit 258. Feature vector converting unit 258 converts the outputs of flag extracting unit 240, score normalizing unit 242, score adding unit 246, score normalizing unit 252, flag extracting unit 254 and score adding unit 256 collectively to a part of feature vectors, and outputs as SPPR feature 124. The SPPR feature 124 is applied to SVM 112 shown in FIG. 3.

Returning to FIG. 3, SVM 112 receives feature vectors including basic features 122 from basic feature extracting unit 102 and SPPR features 124 from SPPR feature extracting unit 110 and, in accordance with the values of the features, calculates and outputs a score indicating how plausible the scenario candidate output from scenario candidate reading unit 100 is as a scenario expressing a causality. Score recording unit 114 stores the score and the scenario candidate output from scenario candidate reading unit 100 in association with each other in score-added scenario candidate storage unit 116. Scenario candidate ranking unit 118 sorts and ranks the scenario candidates stored in score-added scenario candidate storage unit 116 in descending order of their scores, and thereby generates and outputs a scenario candidate ranking 52.

[Experimental Results]

Experiments were conducted to compare the performance of scenario generation system 30 having the above-described structure with conventional methods, using test data.

<Data Set>

As test data, we prepared 217,836 scenario candidates formed by chaining two causalities. In the following, the data will be referred to as SRsource. To evaluate the scenario ranking, 6,000 scenario candidates were sampled at random from the SRsource, and three human annotators judged whether each sampled scenario candidate was plausible or not as a scenario. At the time of judging the scenario candidates, we instructed the annotators to regard a scenario candidate as plausible if each causality is plausible, the scenario itself is coherent as a whole and event expressions are related appropriately. The final label used for evaluation was determined by majority vote. The Kappa value was 0.51. In the following, these annotated 6,000 scenarios will be referred to as SRsamples.

SRsamples were split into training data SRtraining and test data SRtest, as shown in Table 1 below.

TABLE 1

|  | Positive Examples | Negative Examples | Total |
| --- | --- | --- | --- |
| $SR_{TRAINING}$ | 1,133 | 2,891 | 4,024 |
| $SR_{TEST}$ | 637 | 1,339 | 1,976 |

Here, the samples were split such that there is no overlap of three noun phrases included in the scenarios between SRtraining and SRtest.

Next, labeled data used for evaluating support passage determination were created. Using scenarios of SRsamples, text passages satisfying the conditions described in the embodiment above were retrieved from 600 million documents of web archive. Text passages were found for 2,180 scenarios among 6,000 scenarios of SRsamples, and 149,850 scenario-text passage pairs in total could be obtained. From the 149,850 scenario-text passage pairs, 18,410 training data (SPtraining) and 3,141 test data (SPtest) were extracted. Three annotators judged whether or not a scenario is expressed on the text passage, for SPtraining and SPtest. We instructed the annotators to classify a scenario-text passage pair as acceptable at the time of judging if the text passage expresses (entails) the scenario. The final label for evaluation was determined by majority vote. The Kappa value was 0.65.

Further, additional training data used for evaluating support passage determination were created. For one of the two causalities included in a scenario, a sentence as a source from which the causality was extracted is searched and retrieved from 600 million documents of the web. Then, where the causality included in the extraction source is represented by c and the sentence as the extraction source by s, if a noun phrase not included in c of the scenario exists within seven sentences preceding (or succeeding) s, the text passage from s to the sentence including the noun phrase was regarded as a candidate of support passage and extracted. Among the scenario-text passages extracted by the above-described method, 19,746 pairs were used as additional training data (SPadd). Three annotators judged whether or not each scenario of SPadd is expressed on the text passage. At the time of judging, we instructed the annotators to regard a scenario-text passage pair as acceptable if the text passage expresses (entails) the scenario. The final label used for actual evaluation was determined by majority vote. The Kappa value was 0.61.

<Evaluation of Support Passage Determination>

First, support passage determination was evaluated using the data shown in Table 2.

TABLE 2

| | Positive Examples | Negative Examples | Total |
|---|---|---|---|
| $SP_{TRAINING}$ | 4,522 | 13,888 | 18,410 |
| $SP_{ADD}$ | 3,099 | 16,647 | 19,746 |
| $SP_{TEST}$ | 315 | 2,826 | 3,141 |

Here, using a development set partially split from SPtraining, the Kernel and C value as hyper parameters of SVM were determined to be the second degree polynominal kernel and C=0.0001, respectively.

As baseline methods to be compared with the support passage determination model (Proposed) in accordance with the above-described embodiment, OkapiBM 25 and PosiProb were used. OkapiBM 25 is a popular algorithm used in information searching and used in software for full text searching such as Lucene (https://lucene.apache.org/core/). PosiProb is a model which regards all inputs as positive examples to be output. For OkapiBM 25, taking each pair of scenario-text passage included in SPtest, all content words included in the scenario were used as queries and scores of corresponding text passages were calculated.

Figure 11:
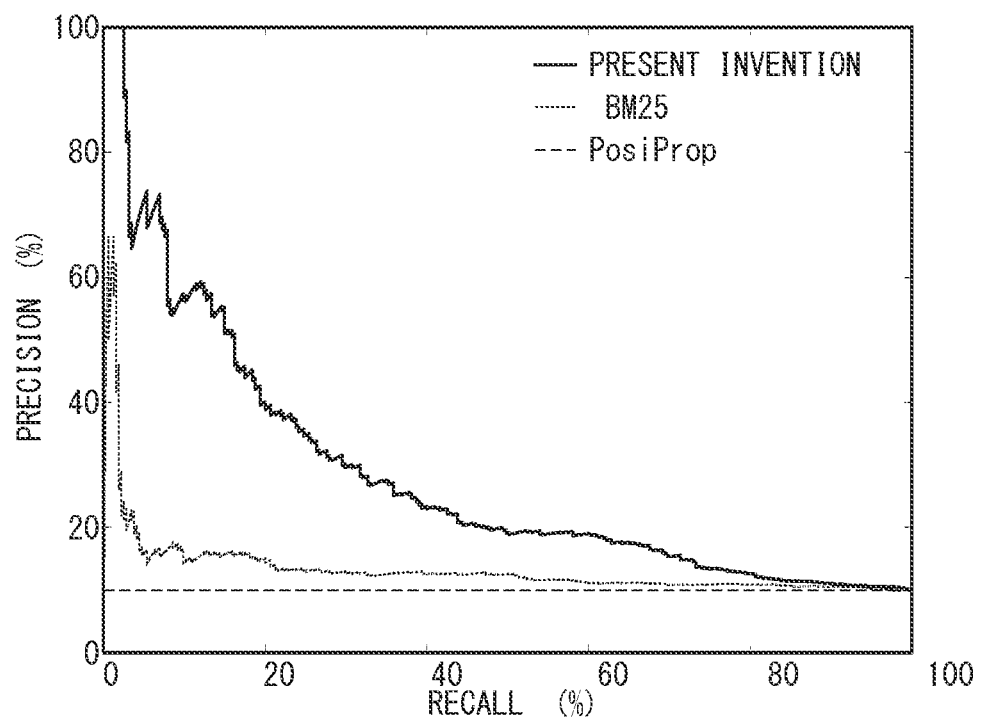
FIG. 11 is a graph showing a PR curve obtained by ranking scenario-scenario passage sets in accordance with scores obtained by various methods in an experiment.

FIG. 11 shows the Precision-Recall curves (PR curves), which were drawn according to the ranks of scenario-text passage pairs given by the scores output by respective methods. PR curve plots the recall by top few search results on the abscissa and precision on the ordinate, with the numbers varied. The higher curve is considered to show more desirable results of search. It can be seen from FIG. 11 that the performance of support passage determination model in accordance with the above-described embodiment outperformed the baseline methods by a large margin. Though its precision lowers as the recall level increases also in the method of the embodiment, it can be confirmed that some correct scenario-text passage pairs were obtained for samples having high scores.

<Evaluation of Scenario Ranking Determination>

Using the data of Table 1, the scenario ranking model employing as features presence/absence of support passage as the method proposed by the present invention was evaluated. In the present experiment, the kernel and C value as the hyper parameters of SVM were determined by cross-valuation on SRtraining, to the third degree polynomional kernel and C=0.001, respectively.

To test SVM 112, text passages were searched from 600 million pages of web archive and scores of scenario passage recognition were calculated. Here, for the support passage determination in the scenario passage recognition, learning was done using SPtraining and SPadd.

The unsupervised ranking method (Hashi14) according to Non-Patent Literature 1 was used as a baseline to be compared with the method (Proposed) of the above-described embodiment. Hashi14 ranks scenarios according to scenario scores (H2 of FIG. 9) calculated based on the causality scores used in the embodiment above.

In addition to Hashi14, two methods, Base and Base+AddData, were also used for comparison. Base is a model the same as Proposed, except that it does not use the features SP1 to SP3 (see FIG. 9) and GSP1 to GSP3 (see FIG. 9) of Proposed. Base+AddData is a model same as Base except that 1,493 scenarios included in the scenario-text passage pairs of positive examples of SPadd were added to the training data as positive examples. The added scenarios are those extracted from the scenario-text passage pairs of positive examples, that is, the scenarios having support passages. Further, the data of DCadd can be used as additional positive examples to SRtraining, since three scenario noun phrases in the scenarios of SRtraining and SRtest do not overlap. The number of additional scenarios obtained from SPadd is larger than the number of positive examples of SRtraining as the original training set and, hence, a large improvement is expected. The difference between Proposed and Base may not be derived from the benefit of features of scenario passage recognition scores but it may just caused by indirect influence of positive example scenarios included in SPadd. In order to eliminate this possibility, Base+AddData was used for comparison. If Proposed outperforms Base+AddData, this implies that the use of scenario passage recognition scores is truly effective in scenario ranking.

Figure 12:
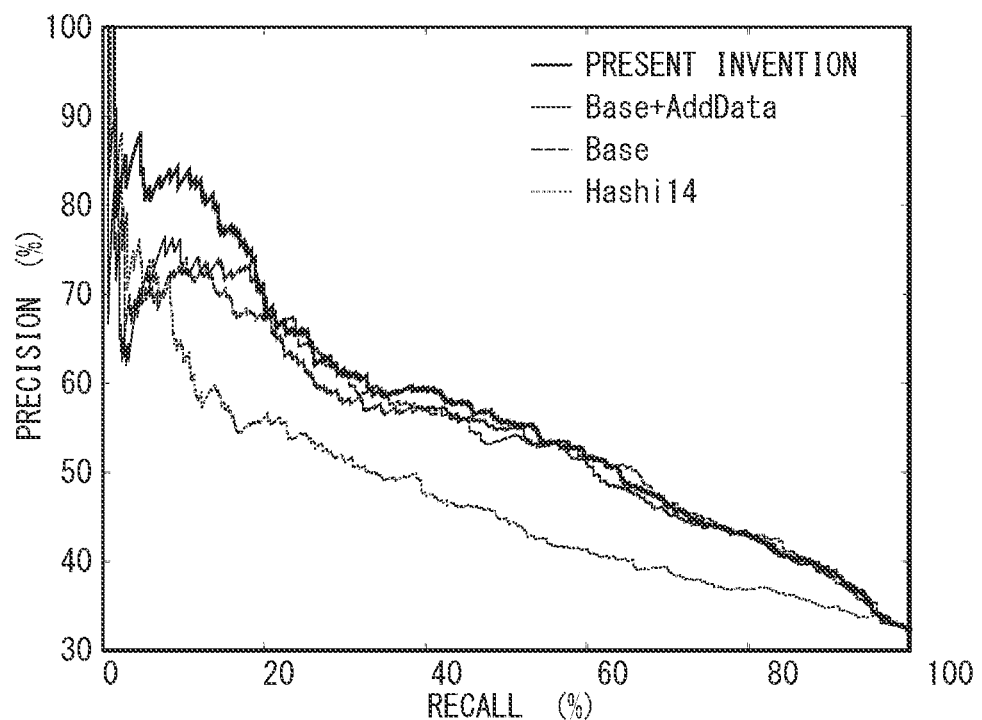
FIG. 12 is a graph showing a PR curve obtained by ranking scenarios in accordance with scores obtained by various methods in an experiment.

FIG. 12 shows the PR curve when scenarios were ranked by each method's score. Proposed outperformed the baselines Hashi14, Base and Base+AddData. Further, by Wilcoxon sign test utilizing scenario ranking, a significance of $p=0.05$ was confirmed between Proposed and each baseline.

[Computer Implementation]

Figure 13:
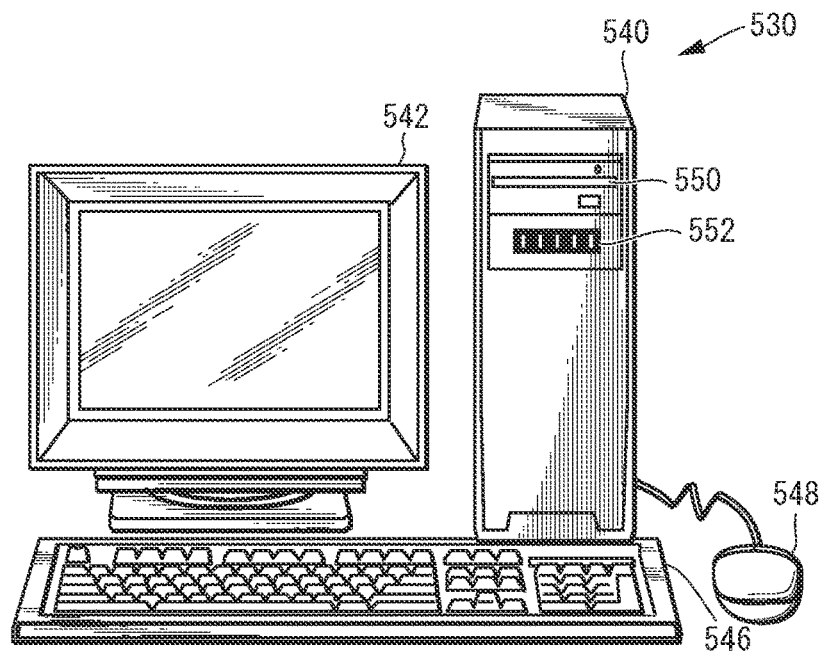
FIG. 13 shows an appearance of a computer system realizing the scenario generation system in accordance with an embodiment of the present invention.

The scenario generation system 30 and its components in accordance with the above-described embodiment can be implemented by computer hardware and a computer program running on the computer hardware. FIG. 13 shows an appearance of computer system 530 and FIG. 14 shows an internal configuration of computer system 530.

Referring to FIG. 13, computer system 530 includes a computer 540 having a memory port 552 and a DVD (Digital Versatile Disc) drive 550, a keyboard 546, a mouse 548 and a monitor 542.

Figure 14:
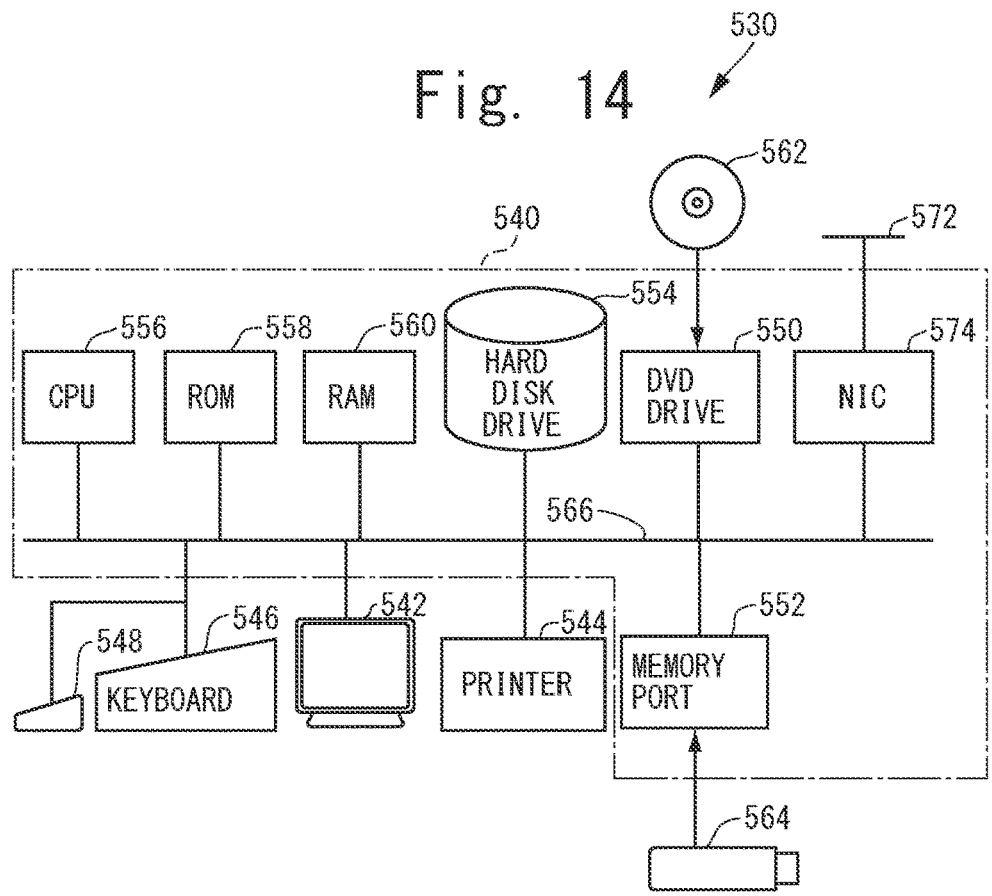
FIG. 14 is a block diagram of the computer shown in FIG. 13.

Referring to FIG. 14, in addition to memory port 552 and DVD drive 550, computer 540 includes a CPU (Central Processing Unit) 556, a bus 566 connected to CPU 556, memory port 552 and DVD drive 550, a read-only memory (ROM) 558 for storing a boot program and the like, a random access memory (RAM) 560 connected to bus 566 and storing program instructions, a system program and work data, and a hard disk drive 554. Computer system 530 further includes a printer 544, and a network interface card (NIC) 574 providing a connection to a local area network (LAN) 572, enabling communication with other terminals.

In the present embodiment, causality expression storage unit 40, scenario candidate storage unit 44, web archive 50 and positive example storage unit 54 shown in FIG. 1, template polarity storage unit 80 shown in FIG. 2, causality score storage unit 140, logarithmic scale frequency storage unit 142, noun phrase class storage unit 144, extraction source documents storage unit 146, entailment score storage unit 148 and polarity storage unit 150 shown in FIG. 4, group-by-group semantic scenario score storage unit 220 shown in FIG. 5, web archive storage unit 308, noun phrase class storage unit 310, polarity storage unit 312, and threshold value storage unit 322 shown in FIG. 6, and noun phrase class storage unit 310 and polarity storage unit 312 shown in FIG. 7 are all realized by HDD 554 or RAM 560.

The computer program causing computer system 530 to realize functions of scenario generation system 30 and its components is stored in a DVD 562 or a removable memory 564 loaded to DVD drive 550 or memory port 552, and transferred to HDD 554. Alternatively, the program may be transmitted to computer 540 through network 572 and stored in HDD 554. The program is loaded to RAM 560 at the time of execution. The program may be directly loaded to RAM 560 from DVD 562, removable memory 564, or through network 572 and NIC 574.

The program includes a plurality of instructions causing computer 540 to operate as scenario generation system 30 in accordance with the embodiment above. Some of the basic functions necessary to cause computer 540 to operate in this manner are provided by the operating system running on computer 540, by a third-party program, or various tool kit modules installed in computer 540. Therefore, the program itself may not include all functions to realize the system and method of the present embodiment. The program may include only the instructions that call appropriate functions or "programming tool kits" in a controlled manner to attain a desired result and thereby to realize the operation of scenario generation system 30 and its components described above. The operation of computer system 530 is well known and, therefore, description thereof will not be repeated here.

[References List]
<Reference 1>
Kazama, J. and Torisawa, K. (2008). "Inducing gazetteers for named entity recognition by large-scale clustering of dependency relations." In Proceedings of the 46th Annual Meeting of the Association for Computational Linguistics: Human Language Technologies (ACL-08: HLT), pp. 407-415.
<Reference 2>
Chikara Hashimoto, Kentaro Torisawa, Kow Kuroda, Masaki Murata, and Jun'ichi Kazama. 2009. Large-scale verb entailment acquisition from the web. In Proceedings of the 2009 Conference on Empirical Methods in Natural Language Processing (EMNLP2009), pages 1172-1181.

INDUSTRIAL APPLICABILITY

When a causality that is not directly apparent to humans is to be found by natural language processing using a computer from a huge amount of information represented by texts on the net, the present invention verifies reliability of the causality. Therefore, by the present invention, it becomes possible to provide, with high reliability, business plans and production plans, as well as guidelines and predictions related to research programs of various fields including both scientific field and humanities field. As a result, the system employing the present invention makes it possible to provide data-based information in a wide range of fields and usable effectively not only in industries providing such information but also in every industry using the obtained information.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

REFERENCE SIGNS LIST 30 scenario generation system
40 causality expression storage unit
42 scenario candidate generating unit
44, 302 scenario candidate storage unit
46 scenario classifier
48 scenario passage pair recognizer
50 web archive
52 scenario candidate ranking
54 positive example storage unit
70 causality pair selecting unit
80 template polarity storage unit
82 scenario candidate selecting unit
100 scenario candidate reading unit
102 basic feature extracting unit
104 SPPR feature generating information
106 scenario transmitting unit
110 SPPR feature extracting unit
112 SVM
118 scenario candidate ranking unit
140 causality score storage unit
142 logarithmic scale frequency storage unit
144, 310 noun phrase class storage unit
146 extraction source documents storage unit
152, 328 scenario candidate
154 logarithmic scale frequency searching unit
156, 304, 364 noun phrase extracting unit
158, 366 noun phrase class determining unit
164, 368, 374 template extracting unit
168 scenario score calculating unit
172, 370, 376 polarity determining unit
174 word similarity calculating unit
220 group-by-group semantic scenario score storage unit
306 text passage searching unit
314 feature extracting unit
316 classifier
318 score accumulating unit
330 maximum value selecting unit
340 text passage

The invention claimed is:
1. A scenario passage pair recognizer for outputting a reliability of a scenario candidate based on passages identified as supporting context of the scenario candidate from a plurality of documents,
said scenario passage pair recognizer including a processor configured to:
receive the scenario candidate, wherein the scenario candidate includes at least three event expressions:
receive the plurality of documents from a machine-readable storage device storing said plurality of documents;
identify, in said plurality of documents, a set of text passages;
that each includes no more than a certain number of sentences of a document; and
in each of which all noun phrases included in said scenario candidate co-occur;
form combinations of said candidate and each of the identified text passages;
extract a predetermined feature from each of the combinations;
for each of said extracted features, output from a pre-trained classifier a score indicating reliability of the scenario candidate calculated based on said text passages as a source of said feature; and output the reliability of the at least three event expressions of said scenario candidate expressing a chained causality based on the maximum value of the scores output from the pre-trained classifier.

2. The scenario passage pair recognizer according to claim 1, wherein said certain number is an integer not smaller than 2 and not larger than 10.

3. The scenario passage pair recognizer according to claim 1, wherein said certain number is an integer not smaller than 3 and not larger than 8.

4. The scenario passage pair recognizer according to claim 1, further comprising a non-transitory computer readable medium for storing a scenario candidate having said score higher than a threshold value, among said scenario candidates.

5. A scenario classifier receiving a scenario candidate including at least three event expressions possibly expressing a chained causality, and determining whether or not the scenario candidate is plausible as a causality, comprising a processor configured to:
   receive an input of said scenario candidate, applying the scenario candidate to the scenario passage pair recognizer according to claim 1, and receiving the reliability output from the scenario passage pair recognizer;
   extract a prescribed feature from said scenario candidate; and
   output from a pre-trained classifier, upon receiving an input including said extracted prescribed feature and the received reliability, a score indicating plausibility of said scenario candidate as a causality.

6. A computer readable, non-transitory computer medium having stored thereon a computer program which, when executed, causes a computer to function as processor described in claim 1.

* * * * *